US012263582B2

(12) United States Patent
Pounds

(10) Patent No.: US 12,263,582 B2
(45) Date of Patent: Apr. 1, 2025

(54) GYROSCOPICALLY STABILISED LEGGED ROBOT

(71) Applicant: The University of Queensland, St Lucia (AU)

(72) Inventor: Pauline Edith Iyan Pounds, St Lucia (AU)

(73) Assignee: THE UNIVERSITY OF QUEENSLAND, Queensland (AU)

( * ) Notice: Subject to any disclaimer, the term of this patent is extended or adjusted under 35 U.S.C. 154(b) by 887 days.

(21) Appl. No.: 17/299,213

(22) PCT Filed: Dec. 3, 2019

(86) PCT No.: PCT/AU2019/051316
§ 371 (c)(1),
(2) Date: Jun. 2, 2021

(87) PCT Pub. No.: WO2020/113262
PCT Pub. Date: Jun. 11, 2020

(65) Prior Publication Data
US 2021/0379774 A1    Dec. 9, 2021

(30) Foreign Application Priority Data

Dec. 3, 2018    (AU) ................................ 2018904591

(51) Int. Cl.
*B25J 19/00* (2006.01)
*B25J 9/16* (2006.01)
(Continued)

(52) U.S. Cl.
CPC .......... *B25J 19/0008* (2013.01); *B25J 9/162* (2013.01); *B25J 13/089* (2013.01); *B62D 37/06* (2013.01);
(Continued)

(58) Field of Classification Search
CPC ...... B25J 19/0008; B25J 9/162; B25J 13/089; B62D 37/06; B62D 57/022; B62D 57/032
See application file for complete search history.

(56) References Cited

U.S. PATENT DOCUMENTS 5,369,346 A * 11/1994 Takahashi ............ B62D 57/032
318/568.17
6,527,071 B1    3/2003 Villedieu
(Continued)

FOREIGN PATENT DOCUMENTS

CN    103273982 A    9/2013
CN    103612687      3/2014
(Continued)

OTHER PUBLICATIONS

Gajamohan, Mohanarajah, et al., "The Cubli: A Cube that can Jump Up and Balance", Proceedings of IEEE/RSJ International Conference on Intelligent Robots and Systems, 2012, pp. 3722-3727.
(Continued)

Primary Examiner — Anne Marie M Boehler
(74) Attorney, Agent, or Firm — Nixon & Vanderhye, PC

(57) ABSTRACT

A gyroscopically stabilised legged robot including: a body; a number of legs coupled to the body and configured for providing legged locomotion of the robot across a surface in use; an orientation sensor for detecting an angular orientation of the body; a control moment gyroscope mounted on the robot, the control moment gyroscope including a rotor that spins around a rotor spin axis in use, and a tilting mechanism for supporting the rotor relative to the robot, the tilting mechanism being configured to rotate the rotor spin axis about two gyroscope rotation axes to thereby generate respective gyroscopic reaction torques; and a gyroscope controller configured to control operation of the tilting mechanism based at least in part on the detected angular orientation of the body, such that gyroscopic reaction
(Continued)

torques are generated to at least partially stabilise the angular orientation of the body during the legged locomotion of the robot.

18 Claims, 15 Drawing Sheets

(51) Int. Cl.
    *B25J 13/08*         (2006.01)
    *B62D 37/06*         (2006.01)
    *B62D 57/02*         (2006.01)
    *B62D 57/032*       (2006.01)

(52) U.S. Cl.
    CPC ......... B62D 57/022 (2013.01); B62D 57/032 (2013.01)

(56) References Cited

U.S. PATENT DOCUMENTS

| | | | |
|---|---|---|---|
| 2004/0027086 A1* | 2/2004 | Ogawa | B25J 19/005 318/568.12 |
| 2008/0047375 A1 | 2/2008 | Sonoura | |
| 2016/0185405 A1* | 6/2016 | Takanishi | B62D 57/032 901/1 |
| 2019/0240832 A1* | 8/2019 | Kawaguchi | B25J 17/0258 |
| 2020/0376661 A1* | 12/2020 | Jung | B62D 57/032 |
| 2022/0016773 A1* | 1/2022 | Tsuzaki | B25J 19/021 |

FOREIGN PATENT DOCUMENTS

| | | |
|---|---|---|
| CN | 105691482 A | 6/2016 |
| CN | 108297964 | 7/2018 |
| CN | 108436916 A | 8/2018 |
| JP | 2004-009205 A | 1/2004 |

OTHER PUBLICATIONS

Wong, Terence C. F., et al., "Stabilization of Biped Dynamic Walking Using Gyroscopic Couple", Proceedings of IEEE International Joint Symposia on Intelligence and Systems, 1996, pp. 102-108.

Extended European Search Report dated Sep. 28, 2022, issued in European Application No. 19893539.7, 10 pages.

International Search Report for PCT/AU2019/051316 mailed Jan. 21, 2020, 4 pages.

Written Opinion of the ISA for PCT/AU2019/051316 mailed Jan. 21, 2020, 4 pages.

International Preliminary Report on Patentability and Written Opinion of the International Searching Authority dated Jun. 8, 2021, issued in International Application No. PCT/AU2019/051316, 5 pages.

* cited by examiner

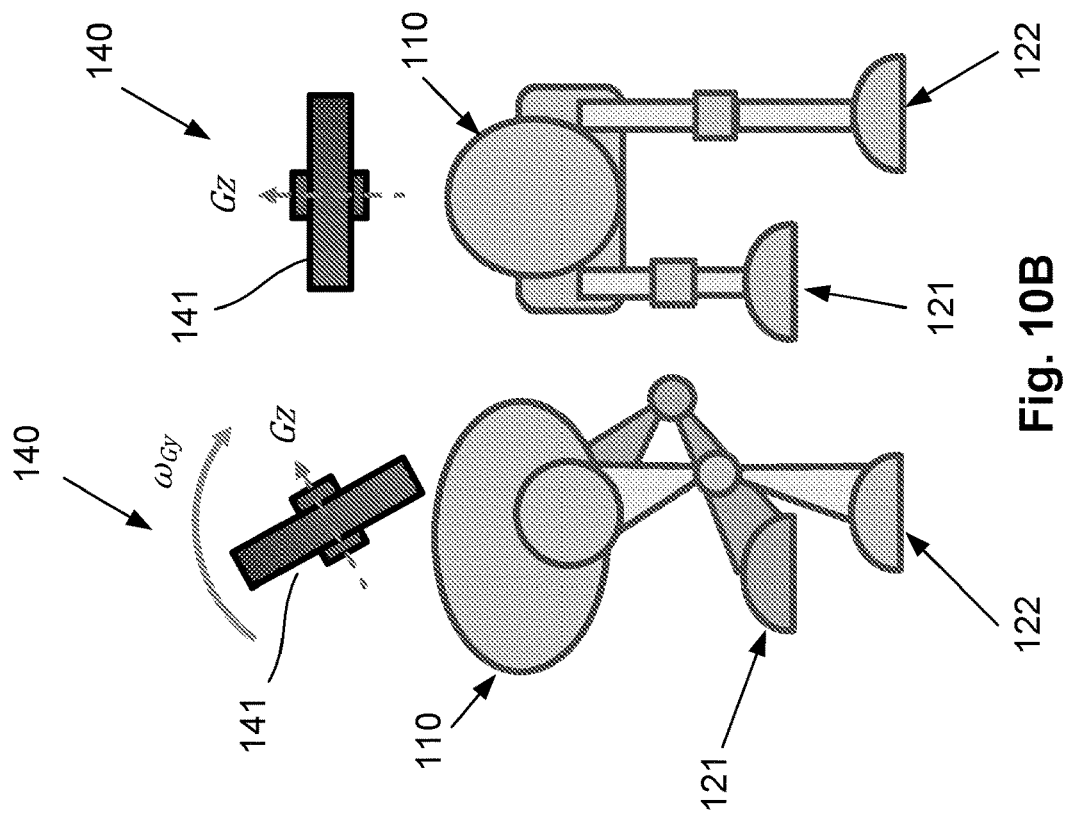
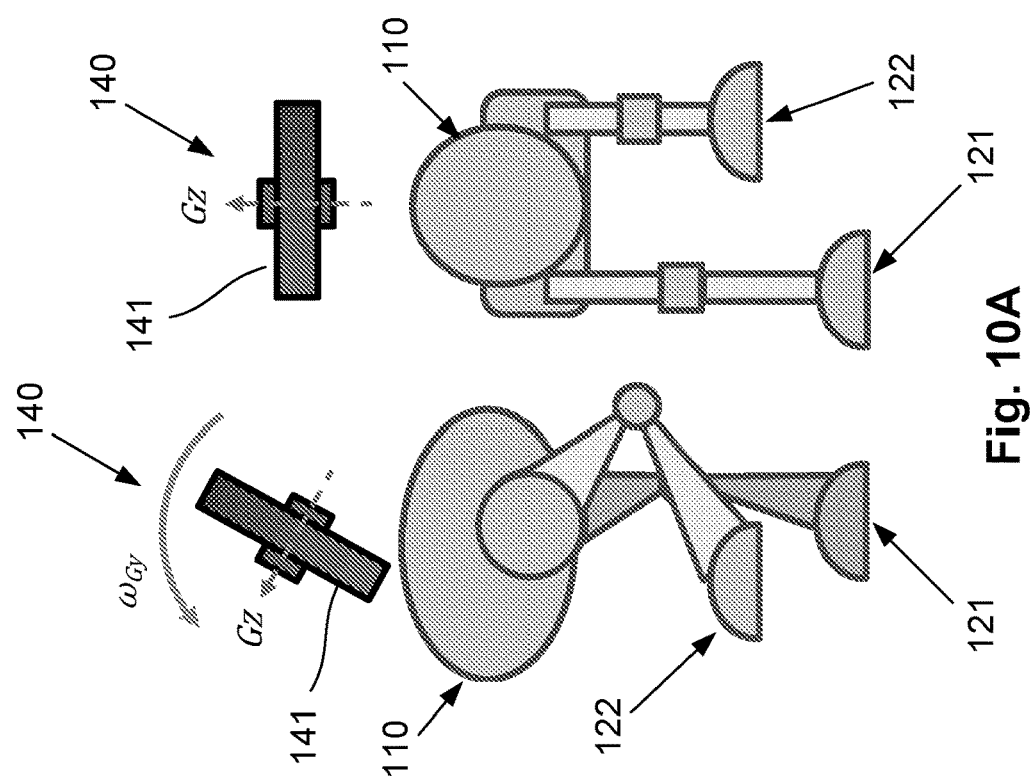
Fig. 10A
Fig. 10B

GYROSCOPICALLY STABILISED LEGGED ROBOT

This application is the U.S. national phase of International Application No. PCT/AU2019/051316 filed Dec. 3, 2019 which designated the U.S. and claims priority to AU Patent Application No. 2018904591 filed Dec. 3, 2018, the entire contents of each of which are hereby incorporated by reference.

BACKGROUND OF THE INVENTION

The present invention relates to a gyroscopically stabilised legged robot.

DESCRIPTION OF THE PRIOR ART

Bipedal robots promise mobility capabilities on par with humans, with the attendant ability to navigate difficult terrain inaccessible to wheeled vehicles or unwieldy for quadrupeds or hexapods. This mobility comes at significantly increased design, control and actuation cost and complexity; this is highlighted by recent advancements in humanoid robotics, where a walking platform may cost hundreds of thousands of dollars. Such robots use sophisticated motion sensing and control combined with very capable actuators to provide fast application of required balance forces through contact with the ground. However, there are lower-end tasks such as compound/area security, urban patrol, search and rescue, and domestic applications where a more economical, if less capable, dynamic bipedal walking machine may be useful. These robots would necessarily use a different, simpler control scheme than modulating ground contact force balance.

The applicant identifies four key features of such a machine: bipedal stance; terrain handling of stairs, ramps and rough ground; rapid (dynamic) gait; and, non-reliance on articulated arms for balance. Bipedal stance and terrain handling allow the robot to handle constructed human spaces, and rapid gait is required to allow the robot to move at a useful pace and cover ground in a timely fashion. Dynamic gait is seen as essential to both fast motion and low cost, as stance shifting to keep the center of gravity over the robot's support polygon is both slow and requires leg abduction actuation in both hips and ankles. The rationale for avoiding complex articulated arms/pendulums for balance-keeping is similar, with the additional consideration that moving appendages may not be appropriate for use around humans where they may pose a hazard. These challenges require a compensation system to reject disturbances.

During each stride, a dynamic biped robot moves its centre of mass outside of its support point/polygon. Classic zero moment point control involves balancing the contact point of the feet to regulate angular momentum to zero. This requires high performance sensing and actuation to place the limbs in the appropriate position at each point in time, resulting in expensive walking machines. A simpler approach is to instead incorporate an additional torque control device.

One conventional approach is to use reaction wheel-based control. Rather than dynamically adjusting leg position to correct its balance, a reaction wheel transfers angular momentum to a moving mass to induce a reaction torque opposing the imbalance. Simple reaction wheels have long been used on robots such as satellites, wheeled robots, and 'walking' robots such as Cubeli (M. Gajamohan, M. Merz, I. Thommen and R. D'Andrea, "*The Cubli: A Cube that can Jump Up and Balance*", in Proc. IEEE/RSJ International Conference on Intelligent Robots and Systems, 2012.). A key limitation of reaction wheels, however, is that the operation of common electric motors and bearings puts an upper-limit on the achievable speed of the wheel, and thus the sustainment of acceleration—at maximum speed, the reaction wheel saturates and no further momentum may be cancelled. Increasing the mass of the flywheel allows for greater momentum transfer prior to saturation, but at the cost of added weight that must be carried.

Wong & Hung (Terence C. F. Wong and Y. S. Hung, "*Stabilization of Biped Dynamic Walking Using Gyroscopic Couple*" in Proc. IEEE International Joint Symposia on Intelligence and Systems, 1996.) disclosed a strategy for stabilization of biped dynamic walking using a gyroscopic couple, using a dynamic walking machine where a gyroscope mounted on top of the biped is precessed to achieve balancing both in the coronal and sagittal planes. A gait was devised and simulation results were provided to show the feasibility of proposed balancing method. However, the gait and precession of the gyroscope had to be tightly synchronized and the use of this strategy imposed restrictive constraints on the gaits available for use.

JP2004009205A disclosed another example of attitude stabilization of a two-legged walking robot. The robot has a body; a pair of legs provided at a lower part of the body; and one or more control moment gyroscope provided on at least one of the body and the pair of legs so as to generate a torque for varying the attitude of the two-legged walking robot. However, this uses a complex twin-type CMG to provide a torque in a single axis only.

It would be desirable to provide a simplified gyroscopically stabilised legged robot which allows improved orientation control, independently of the leg locomotion movements.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In one broad form an aspect of the present invention seeks to provide a gyroscopically stabilised legged robot including: a body; a number of legs coupled to the body and configured for providing legged locomotion of the robot across a surface in use; an orientation sensor for detecting an angular orientation of the body; a control moment gyroscope mounted on the robot, the control moment gyroscope including: a rotor that spins around a rotor spin axis in use; and a tilting mechanism for supporting the rotor relative to the robot, the tilting mechanism being configured to rotate the rotor spin axis about two gyroscope rotation axes to thereby generate respective gyroscopic reaction torques; and a gyroscope controller configured to control operation of the tilting mechanism based at least in part on the detected angular orientation of the body, such that gyroscopic reaction torques are generated to at least partially stabilise the angular orientation of the body during the legged locomotion of the robot.

In one embodiment the orientation sensor is for detecting at least an angular orientation of the body about pitch and roll axes of the body, and wherein the gyroscope controller is configured to control operation of the tilting mechanism such that gyroscopic reaction torques are generated to at least partially stabilise the angular orientation of the body about the pitch and roll axes during the legged locomotion of the robot.

In one embodiment each leg has one or more respective leg actuators and the robot includes a motion controller configured to control operation of the leg actuators to cause the legged locomotion of the robot, and wherein the gyroscope controller is decoupled from the leg motion controller.

In one embodiment the legged locomotion of the robot involves different leg stances including some unstable leg stances in which bias moments are induced about at least one of the pitch and roll axes of the body, and wherein the gyroscopic reaction torques are generated to at least partially counteract the bias moments.

In one embodiment the gyroscope controller is further configured to: obtain an indication of a current leg stance; and control operation of the tilting mechanism in accordance with the current leg stance.

In one embodiment the gyroscope controller is further configured to: determine estimated bias moments based on the current leg stance; and control operation of the tilting mechanism based at least in part on the estimated bias moments, such that the gyroscopic reaction torques are generated to at least partially counteract the estimated bias moments.

In one embodiment the gyroscope controller is further configured to: determine that the robot is in a stable leg stance; and while the robot is in the stable leg stance, control operation of the tilting mechanism to cause the rotor spin axis to be rotated to a predetermined rotor spin axis orientation.

In one embodiment the gyroscope controller is further configured to: obtain an indication of a next leg stance in the legged locomotion of the robot; and while the robot is in the stable leg stance, control operation of the tilting mechanism to cause the rotor spin axis to be rotated to a predetermined rotor spin axis orientation based on the next leg stance.

In one embodiment the gyroscope controller includes an orientation stability subsystem for causing gyroscopic reaction torques to be generated for stabilising the orientation of the body based on the detected angular orientation of the body about the pitch and roll axes.

In one embodiment the gyroscope controller includes a bias compensation subsystem for causing gyroscopic reaction torques to be generated for compensating an estimated bias moment based on the leg stance.

In one embodiment the gyroscope controller includes a relaxation control subsystem for at least one of: while the robot is in a stable leg stance, causing the rotor spin axis to be returned to a normal orientation; and while the robot is in an unstable leg stance, causing gyroscopic reaction torques to be generated such that the body assumes an orientation that no longer induces bias moments; and causing a rotational speed of the gyroscope axes to increase proportional to a deviation of the rotor spin axis compared to the normal orientation.

In one embodiment the tilting mechanism is configured to rotate the rotor spin axis relative to a normally vertical orientation of the rotor spin axis.

In one embodiment the rotor spin axis and the respective gyroscope rotation axes are mutually orthogonal.

In one embodiment the tilting mechanism includes a set of two gimbals including respective gimbal actuators and being configured to rotate the rotor spin axis about the gyroscope rotation axes, and wherein the gyroscope controller is configured to control operation of the gimbal actuators.

In one embodiment the two gimbals include: a first gimbal configured to rotate the rotor spin axis about a gyroscope pitch axis; and, a second gimbal configured to rotate the rotor spin axis about a gyroscope roll axis.

In one embodiment the two gimbals include: an inner gimbal that is pivotally coupled to the rotor; and an outer gimbal that is pivotally coupled to the inner gimbal and mounted on the robot.

In one embodiment the rotor spins at a fixed rotor speed in use, and wherein the gyroscopic reaction torques are determined by controlling speeds of rotation of the rotor spin axis about the respective gyroscope axes.

In one embodiment each leg includes hip and knee pivots having respective hip and knee actuators, the legged locomotion being defined by rotational positions of the hip and knee actuators.

In one embodiment each leg includes a foot coupled to the leg by an ankle joint including a two-axis gimbal pivot for providing a pin contact with the surface.

In one embodiment each ankle includes a foot supination actuator configured to apply a turning moment to the foot in the surface plane.

In one embodiment each ankle includes a braking system for selectively preventing rotation of the ankle joint.

In one embodiment the legs are configured to allow the robot to transition between a crouch position that is stable when the hip and knee actuators are deactivated, and a standing position.

In one embodiment the legs are configured so that the hip and ankle pivots can remain aligned vertically during the transition between the crouch and standing positions.

In one embodiment the robot is a bipedal robot including two legs.

In another broad form an aspect of the present invention seeks to provide an orientation control system for use in a legged robot including a body, and a number of legs coupled to the body and configured for providing legged locomotion of the robot across a surface in use, the orientation control system including: an orientation sensor for detecting an angular orientation of the body; a control moment gyroscope mounted on the robot, the control moment gyroscope including: a rotor that spins around a rotor spin axis in use; and a tilting mechanism for supporting the rotor relative to the body, the tilting mechanism being configured to rotate the rotor spin axis about two gyroscope rotation axes to thereby generate respective gyroscopic reaction torques; and a gyroscope controller configured to control operation of the tilting mechanism based at least in part on the detected angular orientation of the body, such that gyroscopic reaction torques are generated to at least partially stabilise the angular orientation of the body during the legged locomotion of the robot.

In another broad form an aspect of the present invention seeks to provide a method for use in controlling the orientation of a legged robot including a body, and a number of legs coupled to the body and configured for providing legged locomotion of the robot across a surface in use, the method including: using an orientation sensor, detecting an angular orientation of the body; using a control moment gyroscope mounted on the robot to generate gyroscopic reaction torques to at least partially stabilise the angular orientation of the body during the legged locomotion of the robot, wherein: the control moment gyroscope includes: a rotor that spins around a rotor spin axis in use; and a tilting mechanism for supporting the rotor relative to the robot, the tilting mechanism being configured to rotate the rotor spin axis about two gyroscope rotation axes to thereby generate respective gyroscopic reaction torques; and the gyroscopic reaction torques are generated using a gyroscope controller configured to control operation of the tilting mechanism based at least in part on the detected angular orientation of the body.

In another broad form an aspect of the present invention seeks to provide a gyroscopically stabilised bipedal robot including: a body; two legs coupled to the body and configured for providing walking locomotion of the robot across a surface in use; an orientation sensor for detecting an angular orientation of the body about pitch and roll axes of the body; a control moment gyroscope mounted on the robot, the control moment gyroscope including: a rotor that spins around a rotor spin axis in use; and a set of two gimbals for supporting the rotor relative to the robot, the gimbals including respective gimbal actuators and being configured to rotate the rotor spin axis about two gyroscope rotation axes to thereby generate respective gyroscopic reaction torques; and a gyroscope controller configured to control operation of the gimbal actuators based at least in part on the detected angular orientation of the body, such that gyroscopic reaction torques are generated to at least partially stabilise the angular orientation of the body about the pitch and roll axes during the walking locomotion of the robot.

In one embodiment the walking locomotion of the robot involves different leg stances including single leg stances in which bias moments are induced about at least one of the pitch and roll axes of the body, and wherein the gyroscopic reaction torques are generated to at least partially counteract the bias moments.

In another broad form an aspect of the present invention seeks to provide a gyroscopically stabilised legged robot including: a body; a number of legs coupled to the body and configured for providing legged locomotion of the robot across a surface in use; an orientation sensor for detecting an angular orientation of the body; two control moment gyroscopes mounted on the robot, each control moment gyroscope including: a rotor that spins around a rotor spin axis in use; and a tilting mechanism for supporting the rotor relative to the robot, the tilting mechanism being configured to rotate the rotor spin axis about a respective gyroscope rotation axis to thereby generate a respective gyroscopic reaction torque; and a gyroscope controller configured to control operation of the tilting mechanisms of the two control moment gyroscopes based at least in part on the detected angular orientation of the body, such that gyroscopic reaction torques are generated to at least partially stabilise the angular orientation of the body during the legged locomotion of the robot.

In one embodiment the orientation sensor is for detecting at least an angular orientation of the body about pitch and roll axes of the body, and the two control moment gyroscopes include: a first control moment gyroscope configured to generate a first gyroscopic reaction torque to at least partially stabilise the angular orientation of the body about the pitch axis; and a second control moment gyroscope configured to generate a second gyroscopic reaction torque to at least partially stabilise the angular orientation of the body about the roll axis.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which:

FIG. 10A are schematic diagrams of corresponding side and front views of an example of a gyroscopically stabilised legged robot, in which the rotor spin axis is being tilted in a forward direction while the robot is in a first leg stance;

FIG. 10B are schematic diagrams of corresponding side and front views of the robot of FIG. 10A, in which the rotor spin axis is being tilted in a rearward direction while the robot is in a second leg stance;

DETAILED DESCRIPTION OF THE PREFERRED EMBODIMENTS

An example of a gyroscopically stabilised legged robot 100 will now be described with reference to FIGS. 1A to 1D.

In broad terms, the robot 100 includes a body 110, and a number of legs 121, 122 coupled to the body 110 and configured for providing legged locomotion of the robot across a surface in use. It will be appreciated that the particular form of legged locomotion will depend on the number and construction of the legs. Whilst the following description will primarily focus on a two-legged (i.e. bipedal) embodiment of the robot 100 as shown in FIGS. 1A to 1D, which is capable of a walking locomotion, it should be understood that the techniques set out below can be applied to robots having any number of legs, ranging from one legged hopping robots to walking robots having more than two legs.

Figure 2:
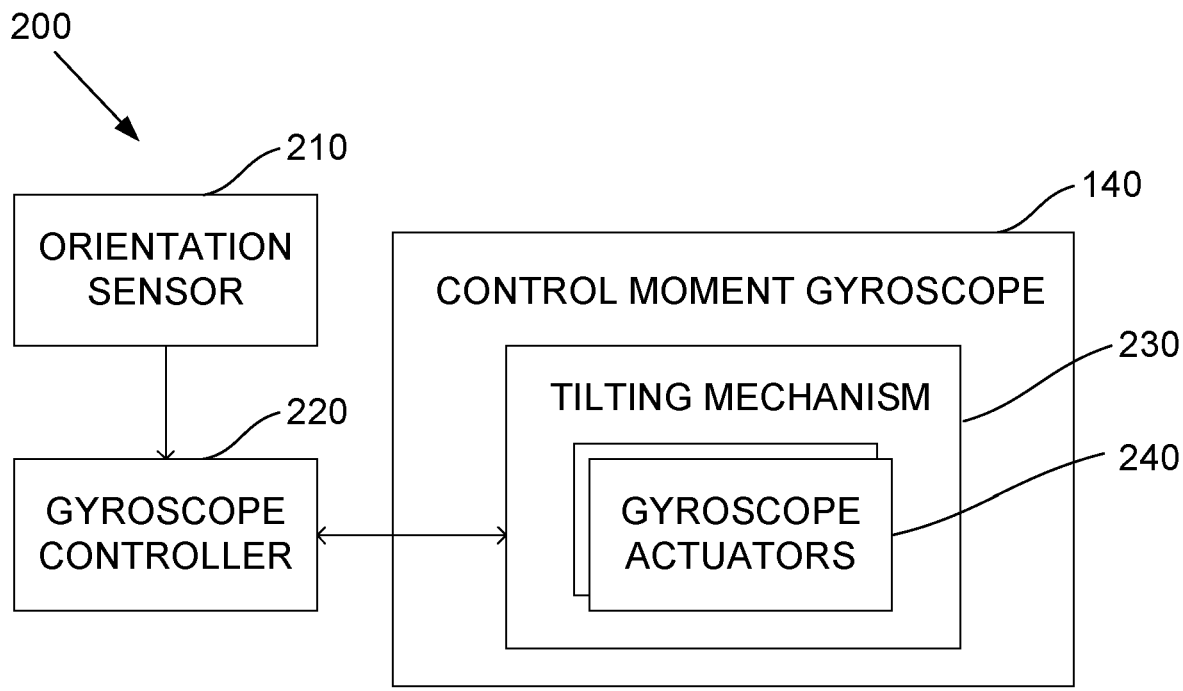
FIG. 2 is a block diagram of an example of an orientation control system for use with the robot of FIG. 1A.

The robot 100 is adapted to at least partially stabilise the angular orientation of the body 110 during its legged locomotion. FIG. 2 is a block diagram of an example of an orientation control system 200 for use in the robot 100 to provide this functionality.

Figure 1A:
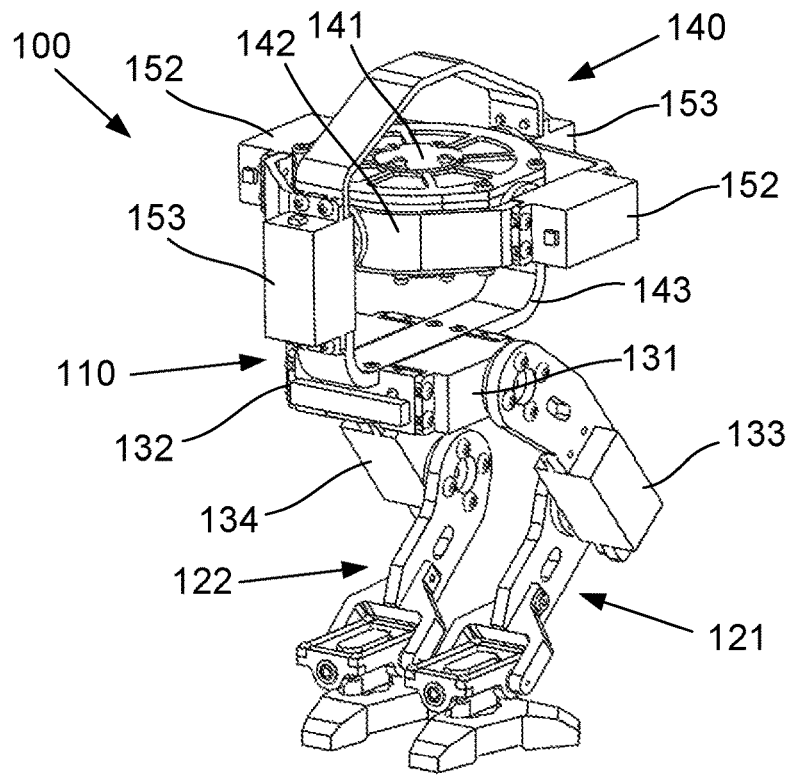
FIG. 1A is a perspective view of an example of gyroscopically stabilised legged robot.
Figure 1B:
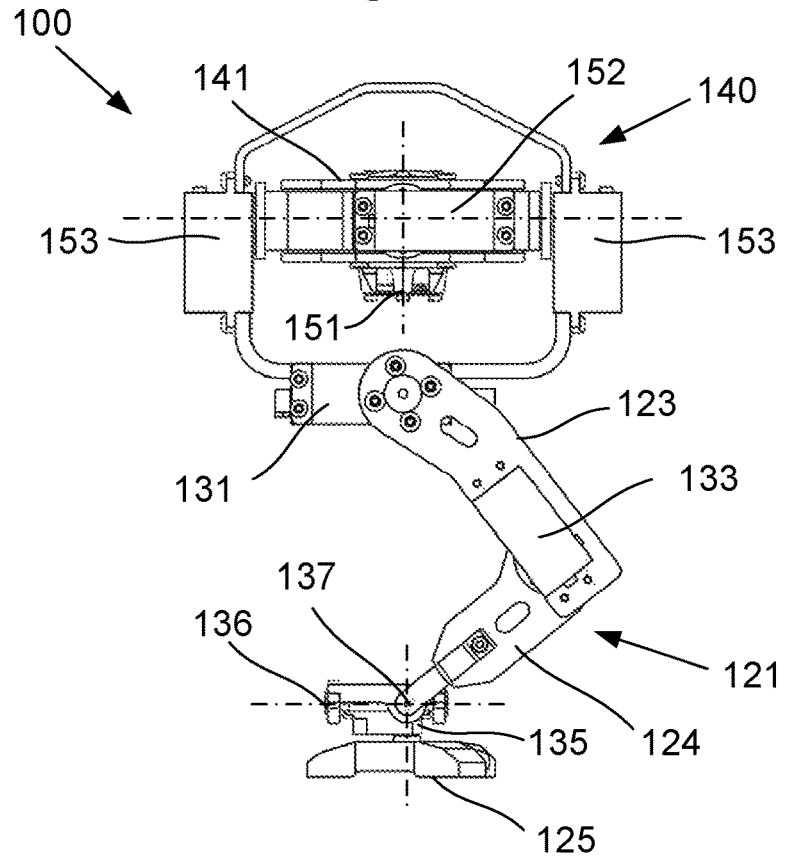
FIG. 1B is a side view of the robot of FIG. 1A.

With respect to FIG. 2, the robot 100 further includes an orientation sensor 210 for detecting an angular orientation of the body 110, and the robot 100 additionally includes a control moment gyroscope (CMG) 140, which is mounted on the robot 100 as generally indicated in FIGS. 1A and 1B.

Figure 1C:
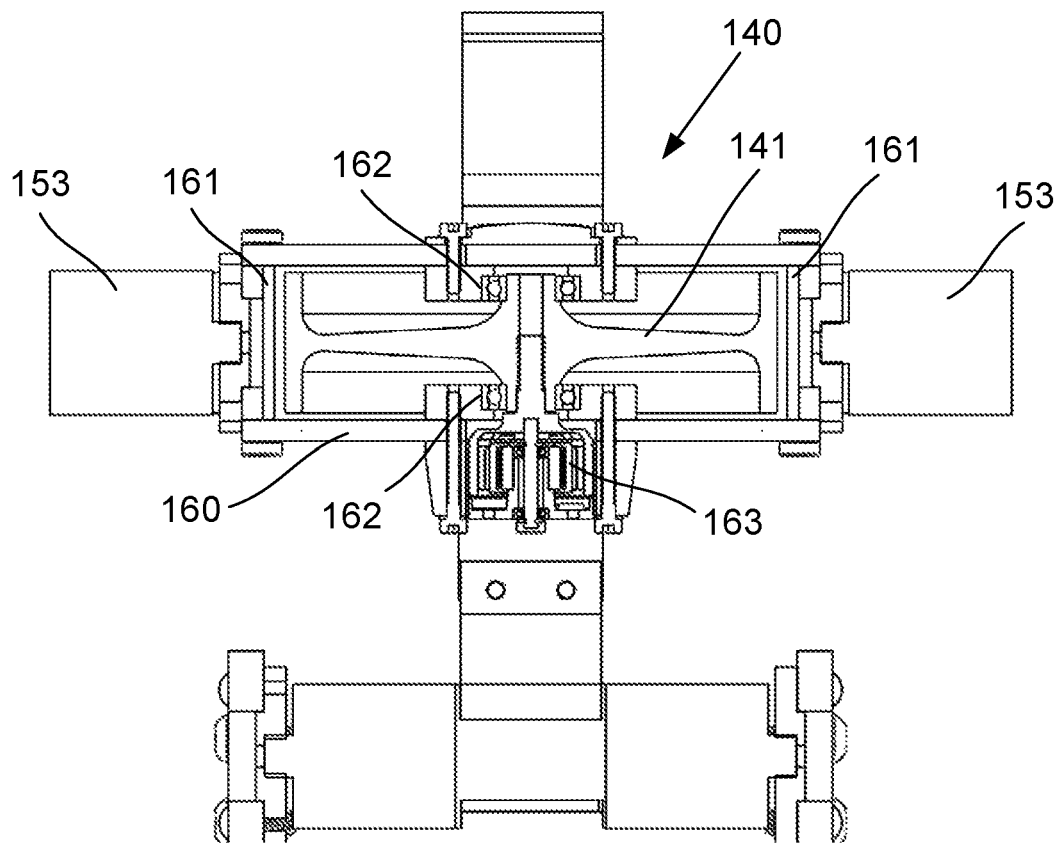
FIG. 1C is a cross section view of the robot of FIG. 1A showing internal features of a control moment gyroscope of the robot.
Figure 1D:
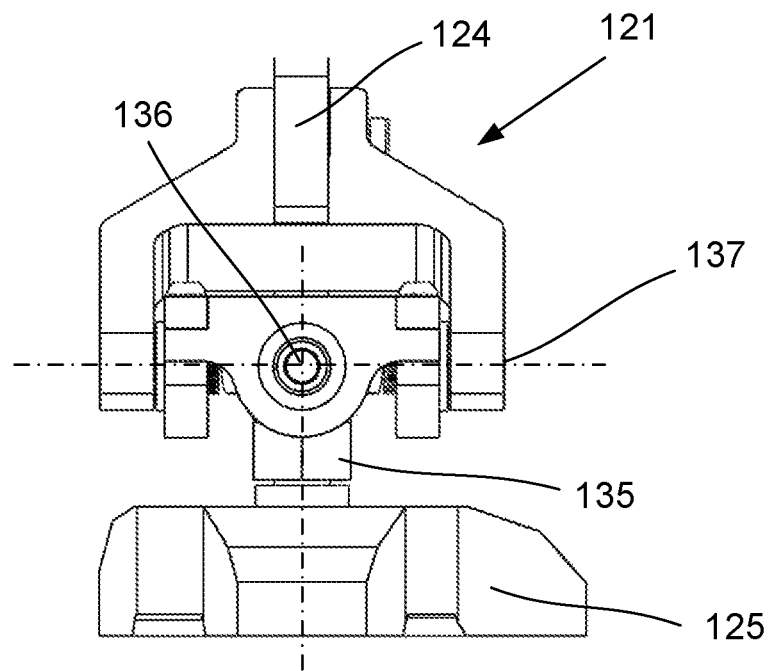
FIG. 1D is a front view of an example of an ankle joint of the robot of FIG. 1A.
Figure 3:
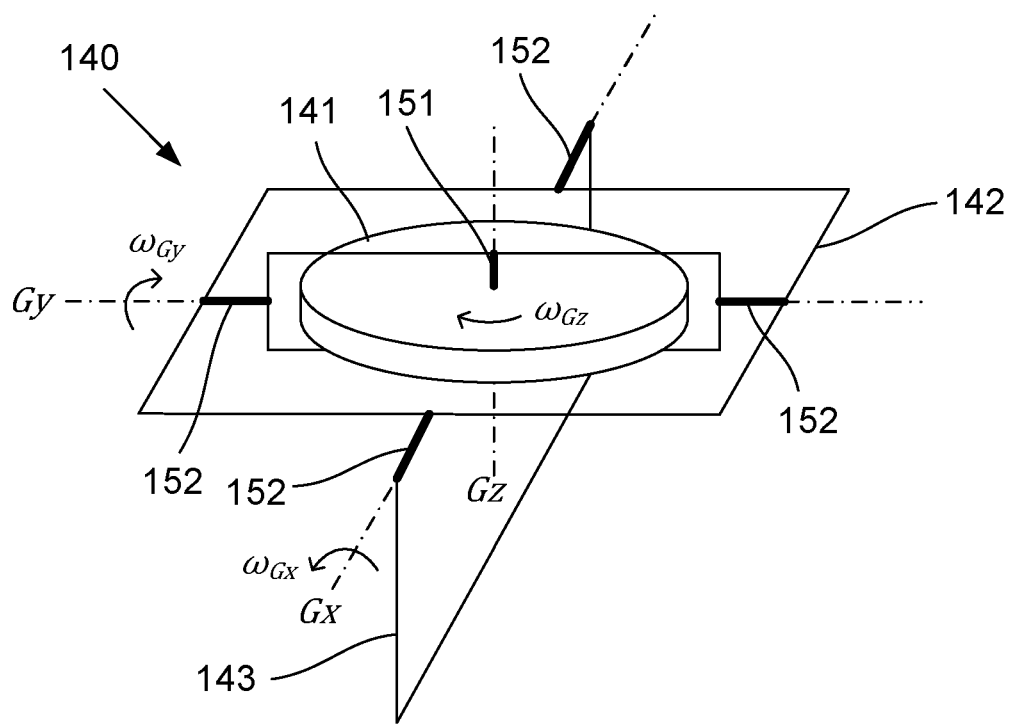
FIG. 3 is a schematic diagram of an example of a control moment gyroscope for use with the robot of FIG. 1A.

Further construction details of the CMG 140 of the embodiment of FIG. 1A can be seen in the cross section view of FIG. 1C, and to further aid understanding, a simplified schematic representation of an example of a CMG 140 is also provided in FIG. 3. In general terms, the CMG 140 includes a rotor 141 that spins around a rotor spin axis Gz and a tilting mechanism 230 (as indicated in FIG. 2) for supporting the rotor 141 relative to the robot 100. The tilting mechanism 230 is configured to rotate the rotor spin axis Gz about two gyroscope rotation axes Gx, Gy, to thereby generate respective gyroscopic reaction torques. Typically, the rotor 141 is spun by a suitable rotor actuator 151 such as a motor, and the tilting mechanism 230 may be provided with a number of gyroscope actuators 240 for causing the rotations of the rotor spin axis Gz.

It will be appreciated that the gyroscopic reaction torques will be generated in response to changes in the rotor's angular momentum when the rotor spin axis Gz is rotated (i.e. as the gyroscope rotor is tilted by the tilting mechanism 230). When the rotor spin axis Gz is rotated about one of the gyroscope axes Gx, Gy, the resulting gyroscopic reaction torque will act orthogonally to both the rotor spin axis and that gyroscope axis. With this in mind, it will be appreciated that the use of a two-axis tilting mechanism 230 (i.e. one that is capable of rotating the rotor spin axis about two different gyroscope axes) can allow for gyroscopic reaction torque components to be generated about two axes, although it should be noted that these axes will be relative to the rotor frame of reference which may be rotated relative to the body 110 of the robot 100 and its respective orientation axes. Nonetheless, desired gyroscopic reaction torques acting about two different axes may be provided by the rotating the rotor spin axis Gz about the two gyroscope axes Gx, Gy in a concerted manner.

Turning again to FIG. 2, the robot 100 includes a gyroscope controller 220 configured to control operation of the tilting mechanism 230 based at least in part on the detected angular orientation of the body 110 (provided by the orientation sensor 210), such that gyroscopic reaction torques are generated to at least partially stabilise the orientation of the body 110 during the legged locomotion of the robot 100. Typically, the gyroscope controller 220 will control the operation of the tilting mechanism 230 by controlling operation of the gyroscope actuators 230, the configuration of which may vary depending on the particular embodiment of the tilting mechanism 230, as discussed further below.

It will be appreciated that the robot 100 may use the CMG 140 to control the orientation of its body 110 during legged locomotion such as walking, as it transitions from leg stance to leg stance. Such an arrangement can provide the advantage of eliminating the slow or shuffling gait of static stability walking, or the need for complex control or high performance actuators in dynamic walking techniques, such as zero moment point, reaction force control and other approaches that rely on the force interaction between a robot's foot/feet and ground for stability.

By controlling the CMG 140 to provide gyroscopic reaction torques in two axes using the tilting mechanism 230, the orientation of the body 110 may be maintained near level (or at some other desired angle). It will be appreciated that rotational movements of the rotor 141 applied by the tilting mechanism 230 may generate gyroscopic reaction torques independent of the motion of the legs 121, 122.

Whilst reaction wheels have been conventionally used as a source of control torque, it will be appreciated that a CMG 140 is different in that applied angular momentum is stored in a spinning mass. In this case the gyroscope rotor 141 spins in an orthogonal direction to the applied momentum transfer. The resultant gyroscopic reaction torque will be a function of the axial velocity of the rotor 141, the rotor's rotational inertia, and the velocity applied orthogonal to the gyroscope's axis:

$$\tau = \omega_{Gz} I_G \begin{pmatrix} \omega_{Gy} \\ -\omega_{Gx} \\ 0 \end{pmatrix} \quad (1)$$

Where $\tau$ is the reaction torque, $\omega_{Gz}$ is the axial velocity in the rotor spin axis Gz, and $\omega_{Gx}$ and $\omega_{Gy}$ are the orthogonal velocities in the gyroscope rotation axes Gx, Gy (as indicated in FIG. 3), and $I_G$ is the inertia matrix of the gyroscope's rotor 141. The multiplicative term of $\omega_{Gz}$ means that a greater amount of momentum transfer may be achieved for a given mass of rotor 141. A noteworthy feature of this technique is that no precise reaction force or torque is required from the legs for stability, thus the ankles may be free pivots.

In the preferred embodiment of the robot 100 shown in FIGS. 1A to 1D, the tilting mechanism 230 includes a set of two gimbals 142, 143 for supporting the rotor 141 relative to the robot 100. The two gimbals 142, 143 include respective gimbal actuators 152, 153, which are configured to rotate the rotor spin axis Gz about the gyroscope rotation axes Gx, Gy which correspond to the pivot axes of the gimbals 142, 143. In this case, the gimbal actuators 152, 153 act as the gyroscope actuators 240 discussed above and the gyroscope controller 220 is configured to control operation of the gimbal actuators 152, 153. It will be appreciated that the use of a dual-gimbal control moment gyroscope 140 in this manner can allow for the gyroscopic reaction torque components to be generated in two axes in response to rotational motion of the gimbal actuators 152, 153.

However, it should be appreciated that the tilting mechanism 230 of the control moment gyroscope 140 does not necessarily require the use of two gimbals 142, 143 as shown. For example, a suitable tilting mechanism 230 may be alternatively implemented using a Stewart Platform or similar parallel robotic platform, configured to support the rotor provide at least two rotational degrees of freedom. In such cases, the tilting mechanism may include gyroscope actuators 240 in the form of a set of linear actuators that may be controlled in a coordinated manner by the gyroscope controller 220 to cause desired rotations of the rotor spin axis Gz.

Accordingly, whilst the following description will focus on the dual-gimbal implementation of the tilting mechanism 230, particularly with regard to specific configurations of the gyroscope controller 220 for controlling the operation of the gimbal actuators 152, 153, it should be understood that the techniques described herein may be applied to other suitable forms of tilting mechanisms 230 having different actuator arrangements.

In preferred embodiments, the orientation sensor 210 may be used for detecting at least an angular orientation of the body about pitch and roll axes of the body 110. The gyroscope controller 220 may thus be configured to control operation of the tilting mechanism 230 such that gyroscopic reaction torques are generated to at least partially stabilise the angular orientation of the body 110 about the pitch and roll axes during the legged locomotion of the robot 100. Thus, the robot 100 may be stabilised in both pitch and roll using a single CMG 140 by controlling the rotational movements of the rotor spin axis Gz provided by the tilting mechanism (such as by controlling the operation of the gimbal actuators 152, 153) as required to achieve desired stability performance.

Typically, each leg 121, 122 has one or more respective leg actuators 131, 132, 133, 134 and the robot 100 may include a motion controller (not shown) configured to control operation of the leg actuators 131, 132, 133, 134 to cause the legged locomotion of the robot 100. Preferably, the gyroscope controller 220 is decoupled from such a leg motion controller. Thus, the locomotion and orientation control functions of the robot 100 may be decoupled. Using this technique, the orientation of the robot 100, and thus its walking stability, may be locally independent of the leg motion. As a result, leg positioning and torque generation need not be exact and cheaper, lower performance leg actuators 131, 132, 133, 134 may be used.

In view of the above, the orientation control functionality of the present invention may be implemented without requiring specific knowledge of the functionality of the motion controller and the specific form of legged locomotion that is provided, and it will be appreciated that any suitable known motion control techniques may be utilised. Accordingly, no further discussion of the motion controller and specific gaits of legged locomotion that may be implemented will be provided herein, on the assumption that suitable conventional techniques will be readily available to those skilled in the art.

Typically, the legged locomotion of the robot 100 may involve a number of different leg stances including some unstable leg stances in which bias moments are induced about at least one of pitch and roll axes of the body. It will be appreciated that these bias moments will typically be induced as a result of an offset between a centre of gravity of the robot 100 and a centre of support defined by any legs 121, 122 in contact with the surface.

Accordingly, in the two-legged embodiment of the robot 100 depicted in FIGS. 1A to 1D, unstable leg stances may include single leg stances in which one of the legs 121, 122 are raised from the surface. Since this embodiment has laterally spaced apart legs 121, 122, raising one of the legs 121, 122 into a single-leg support stance (such as the leg stance shown in FIG. 4B) will cause the centre of gravity of the robot 100 to be laterally offset from the centre of support defined by the other leg 122 which remains in contact with the surface. As a result, a bias moment will be induced about the roll axis of the body 110, such that the robot 100 will tend to fall towards the raised leg 121. Furthermore, if the raised leg 121 is also moved forward to cause the locomotion of the robot 100, this will also cause the centre of gravity of the robot 100 to be longitudinally offset from the centre of support defined by the other leg 122 which remains in contact with the surface. As a result, a bias moment will also be induced about the pitch axis of the body 110, such that the robot 100 will also tend to fall in forward in the direction of movement of the raised leg.

Using the above described orientation control system, bias moments applied to the body 110 by any legs 121, 122 in contact with the surface may be treated as disturbances and compensated for, while the orientation of the robot 100 is stabilised. In particular, the gyroscopic reaction torques may be generated to at least partially counteract any induced bias moments during steps.

As mentioned above, the robot 100 may use a CMG 140 supported by a two-axis gimbal set. Each gimbal 142, 143 may be responsible for generating a respective gyroscopic reaction torque which can be used for controlling the orientation of the robot 100, with the direction of torque being phase shifted 90 degrees to the applied rotational velocity provided by the gimbal. With a two-axis gimbal set, the CMG will reach gimbal-lock at ±90 degrees, at which point the system saturates and no further momentum may be stored. Due to the singularity where the axis of the gimbal aligns with the desired direction of torque application, multiple CMGs would be required to generate arbitrary torques in all conditions.

Figure 9B:
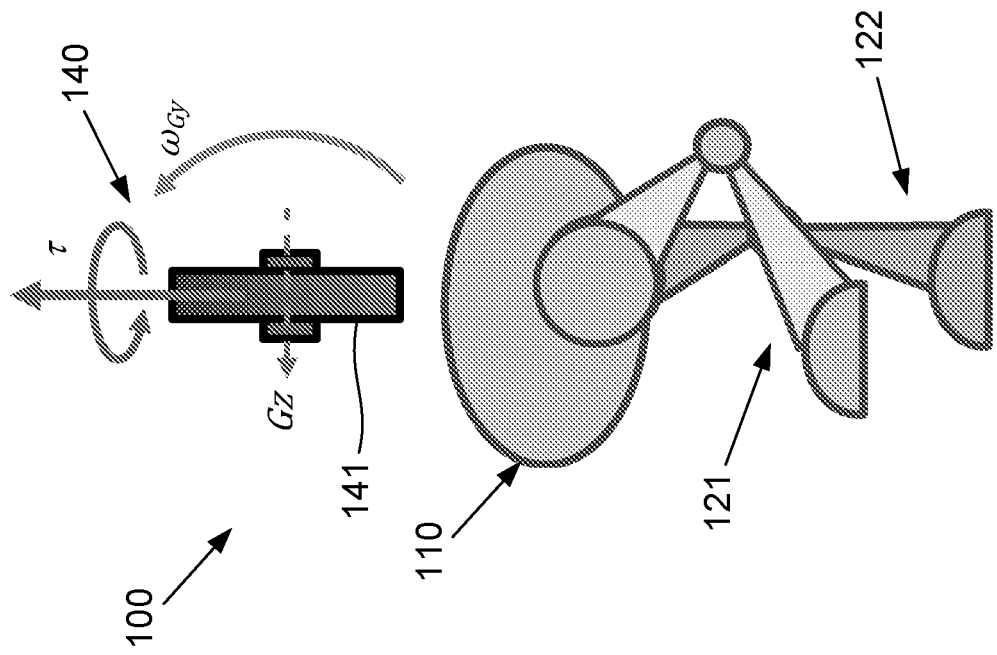
FIG. 9B is a schematic diagram of a side view of the robot of FIG. 9A, in which the rotor spin axis has been tilted by 90° relative to the vertical orientation of FIG. 9A.
Figure 9A:
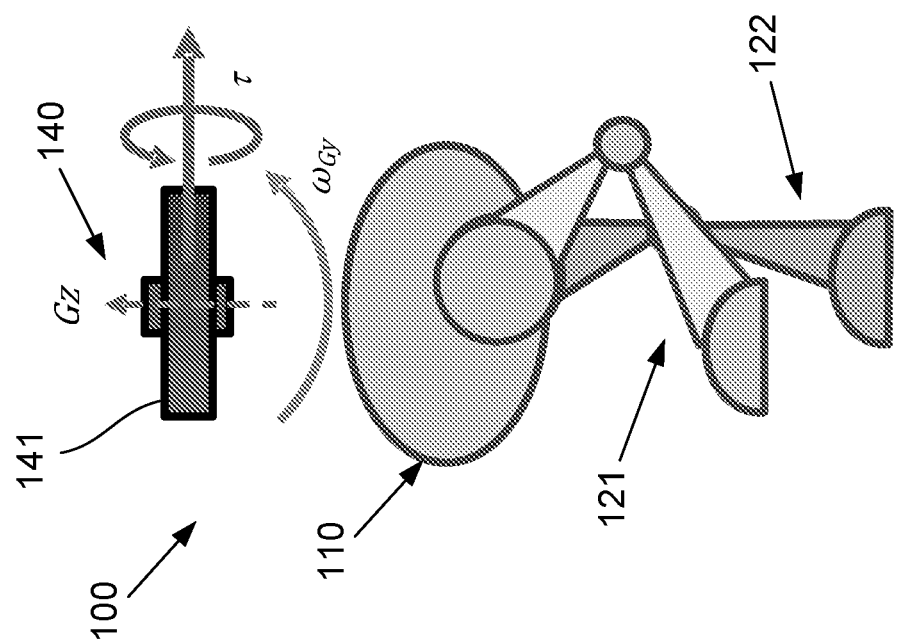
FIG. 9A is a schematic diagram of a side view of an example of a gyroscopically stabilised legged robot, in which a rotor spin axis of the control moment gyroscope is in a vertical orientation.

The above mentioned gimbal-lock phenomenon can be further understood with regard to FIGS. 9A and 9B, which show schematic diagrams of an example of a gyroscopically stabilised legged robot 100 in which the rotor spin axis Gz of the control moment gyroscope 140 is in different orientations. In both of FIGS. 9A and 9B, the robot 100 is in an unstable single-leg support stance in which one leg 121 is raised and the centre of support is defined by the other leg 122. It will be appreciated that a bias moment will be induced about the roll axis of the body 110 in this support stance, as discussed above.

In FIG. 9A, the rotor spin axis Gz is in a vertical orientation, such that operation of the tilting mechanism 230 to apply a rotational velocity $\omega_{Gy}$ as shown (e.g. by rotation of the gimbal 142) will generate a gyroscopic reaction torque τ for stabilising the angular orientation of the body 110 about the roll axis. When the rotor spin axis Gz is in the vertical orientation as shown in FIG. 9A, the gyroscopic reaction torque τ will be generated about the roll axis, and thus can directly counteract the bias moment that is induced about the roll axis in this support stance.

However, as the rotor spin axis Gz is tilted from the vertical orientation through application of the rotational velocity $\omega_{G_y}$, the gyroscopic reaction torque τ is generated with components about the roll axis and about a yaw axis of the body 110. It will be appreciated that, as the tilt angle of the rotor spin axis Gz increases, the component of the gyroscopic reaction torque τ about the roll axis decreases.

FIG. 9B shows the gimbal-lock scenario when the rotor spin axis has been tilted by 90° relative to the vertical orientation of FIG. 9A, in which there is no longer any component of the gyroscopic reaction torque τ about the roll axis decreases. In this situation, the generated torque τ is normal to the desired control direction and is incapable of counteracting the bias moment that is induced about the roll axis in this one-legged support stance. If this condition is reached, the control moment gyroscope 140 can no longer provide effective stabilisation in the roll axis during the legged locomotion of the robot 100.

However, this is not considered an impediment in the context of a legged robot as described herein. Legged locomotion such as walking is a cyclic process in which the support point reaction force alternates fore-aft and left-right of the CoG. The applied bias moments disturbing the orientation of the robot will average to zero over numerous steps. Thus, the CMG 140 of the orientation control system does not require unlimited momentum transfer, but rather sufficient capacity to maintain orientation stability during each step prior to alternating. As momentum storage, tilting the gyroscope rotor 141 to one limit during a step provides more range with which to compensate momentum over the subsequent alternating step. During each step, the system need not be globally stable: instead it need only remain bounded within the saturation limit of the CMG over a given step cycle.

In some examples, the gyroscope controller 220 may be configured to obtain an indication of a current leg stance, and control operation of the tilting mechanism 230 in accordance with the current leg stance. It should be appreciated that such an arrangement does not require coupling between the leg locomotion control and the orientation control functionalities, but merely that leg stance information be provided to the gyroscope controller 220. This leg stance information could simply be in the form of a numerical indicator that is indicative of the current leg stance. For instance, in the bipedal robot 100 as shown in the Figures, a right leg support stance may be indicated as "−1", a dual leg support stance may be indicated as "0", and a left leg support stance may be indicated as "1".

In any event, the leg stance information may be used by the gyroscope controller 220 to allow for more accurate orientation control, with regard to the particular bias moments that may be expected during the different leg stances.

For instance, in some examples, the gyroscope controller 220 may be further configured to determine estimated bias moments based on the current leg stance, and control operation of the tilting mechanism 230 based at least in part on the estimated bias moments, such that the gyroscopic reaction torques are generated to at least partially counteract the estimated bias moments. It will be appreciated that this can facilitate more responsive orientation control. Rather than only reacting to an orientation change due to the robot starting to fall due to a bias moment, the gyroscope controller 220 can cause gyroscopic reaction torques to be generated in advance of the orientation change being detected.

In some examples, the gyroscope controller 220 may additionally or alternatively be configured to determine that the robot 100 is in a stable leg stance, and, while the robot 100 is in the stable leg stance, control operation of the tilting mechanism 230 to cause the rotor spin axis to be rotated to a predetermined rotor spin axis orientation. This may be used, for instance, to restore the rotor spin axis to a normal orientation (such as the vertical orientation as shown in the Figures) after the rotor spin axis has been previously rotated in order to generate gyroscopic reaction torques to counteract bias moments while the robot 100 was in an unstable leg stance.

It will be appreciated that over the course of a step the rotor 141 may be tilted by a significant angle due to rotations of the rotor spin axis by the tilting mechanism 230 for generating gyroscopic reaction torques as required for counteracting bias moments while one of the legs is moved. However, while the robot 100 is in a stable leg stance, the rotor spin axis may be tilted back to its normal orientation and any gyroscopic reaction torques generated as a result of this movement can be reacted through the stable support points provided by legs 121, 122 in contact with the surface.

This functionality may be extended to prepare the CMG 140 for an upcoming leg stance in the legged locomotion of the robot 100. For example, the gyroscope controller 220 may be further configured to obtain an indication of a next leg stance in the legged locomotion of the robot 100, and while the robot 100 is in the stable leg stance, control operation of the tilting mechanism 230 to cause the rotor spin axis to be rotated to a predetermined rotor spin axis orientation based on the next leg stance. For instance, the rotor spin axis may be pre-rotated in an opposite direction to the rotation that will be required for generating a gyroscopic reaction torque to counteract estimated bias moments in the next leg stance. This can allow for a greater range of available rotation for generating the required gyroscopic reaction torques while the robot 100 actually moves through the next leg stance.

As mentioned above, problems associated with saturation of the CMG 140 and gimbal-lock can be at least partially mitigated by cyclically tilting the gyroscope rotor 141 during each step. Examples of this behaviour are illustrated in FIGS. 10A and 10B and this will now be described in further detail.

In FIG. 10A, the robot 100 is in a first leg stance in which the robot 100 is supported by one leg 121 and the other leg 122 is raised, which induces a bias moment tending to tip the robot 100 towards the raised leg 122. In this case, the rotor spin axis Gz is being tilted in a forward direction to thereby counteract the bias moment.

On the other hand, in FIG. 10B, the robot 100 is in a second leg in which the robot 100 is supported by the leg 122 and the leg 121 is raised, which induces a bias moment in the opposite direction the leg stance in FIG. 10A. Accordingly, the rotor spin axis Gz is being tilted in the rearward direction to counteract the bias moment.

It will be appreciated that, as the robot 100 walks and cycles between these opposing leg stances, the gyroscope rotor 141 will be cyclically tilted forwardly and rearwardly to generate the required reaction torques for counteracting the induced bias moments. In other words, during walking locomotion of the robot 100, the bias moment direction will swap from side to side and the gyroscope rotor 141 can be correspondingly tilted fore-aft without reaching a gimbal-lock condition as described above.

Moreover, it will be appreciated that the tilting of the gyroscope rotor 141 in one step can effectively pre-load the gyroscope rotor 141 in preparation for the next step, by increasing the angular range of motion available in the opposing direction for generating reaction torques to counteract the opposing bias moments in the next step.

However, it should be noted that gimbal-lock may still be encountered if an unstable leg stance is held for a prolonged duration such that the rotor spin axis Gz is tilted by 90° from vertical and the gyroscope is saturated. In other words, it will not be possible to maintain a stance in which a leg is raised indefinitely using gyroscopic stabilisation only. This can be mitigated by selecting the gait of the robot 100 to ensure cycling between opposing unstable leg stances within a predetermined period of time.

Even if the above technique is used to avoid gimbal-lock during legged locomotion, the limited range of the control moment gyroscope means accumulated errors cannot be rejected indefinitely. Even small imbalances start to add up, for example binding/friction in joints, weight imbalances in the robot, extrinsic bumps and disturbances. As a result, the gyroscope may drift towards saturation over time. However, other forces can be exploited to correct for these types of accumulated errors, as exemplified below.

Figure 11B:
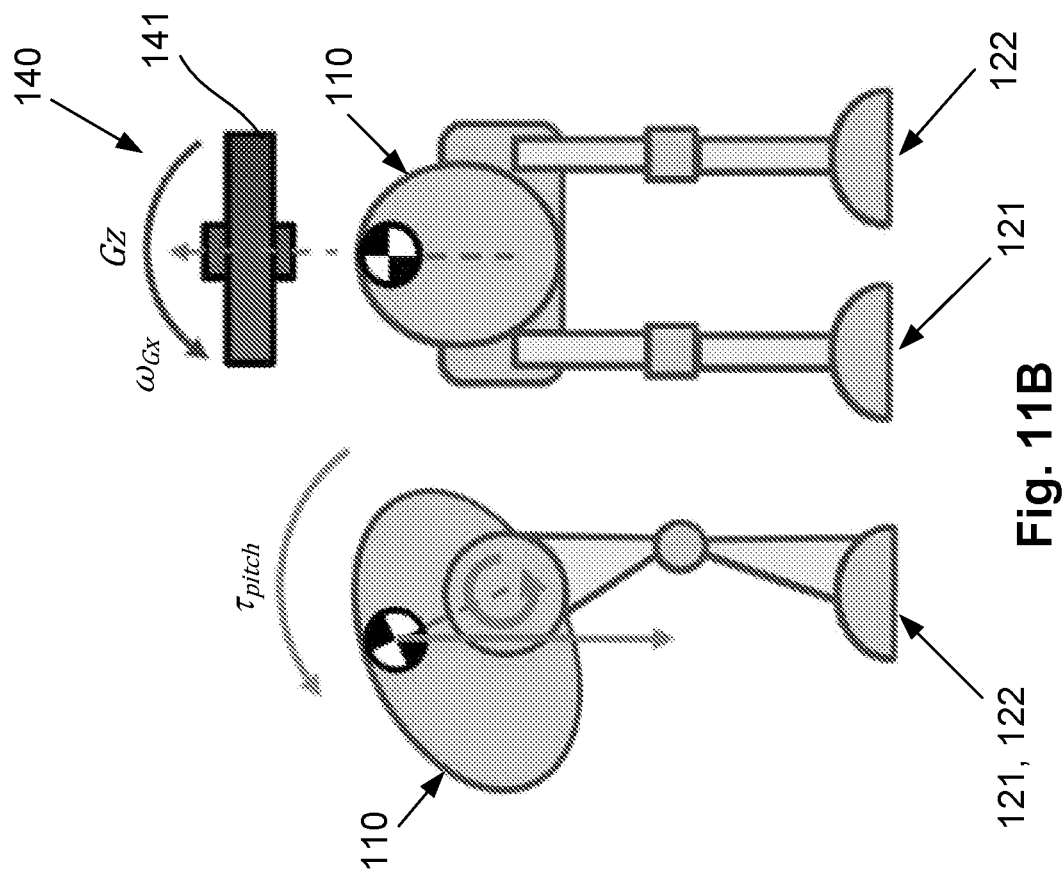
FIG. 11B are schematic diagrams of corresponding side and front views of the robot of FIG. 11A, in which the lateral gyroscope bias is corrected while pivoting the centre of mass of the robot.
Figure 11A:
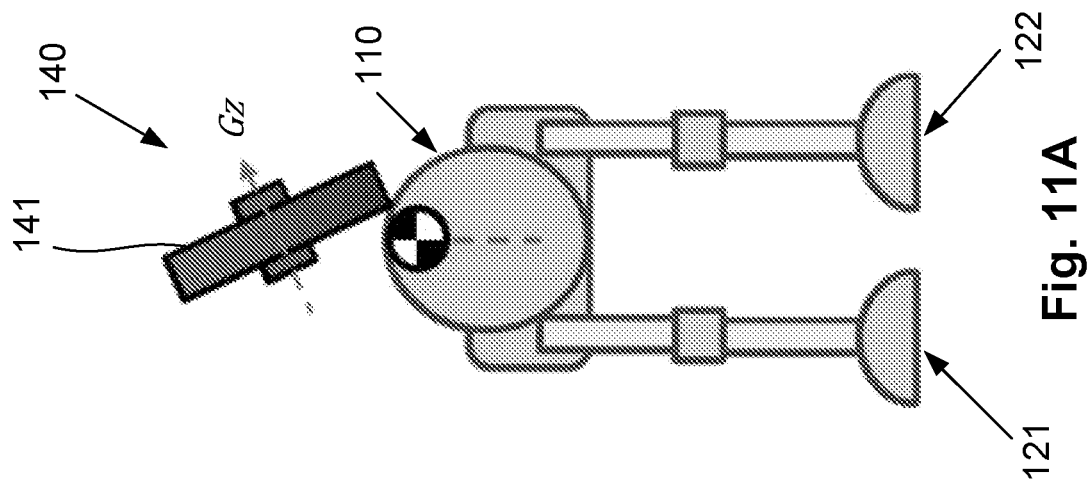
FIG. 11A is a schematic diagram of a side view of an example of a gyroscopically stabilised legged robot, in which lateral gyroscope bias has accumulated.

For example, FIG. 11A shows a scenario in which lateral gyroscope bias has accumulated to a stage where the rotor spin axis Gz has tilted to almost 90° in the lateral direction. It will be appreciated that further lateral gyroscope bias will result in gimbal-lock and render the control moment gyroscope 140 incapable of counteracting further bias moments induced about the pitch axis.

However, FIG. 11B illustrates a strategy for correcting the lateral gyroscope bias of FIG. 11A, which involves intentionally tilting the body 110 of the robot 100. In this case, the centre of gravity of the robot is repositioned longitudinally relative to the support base provided by the legs 121, 122 by pivoting the body 110 relative to the legs 121, 122. This deliberately induces a pitching bias moment $\tau_{pitch}$ in a direction that will require the rotor spin axis Gz to be rotated with a rotational velocity $\omega_{Gx}$ in a direction that reduces the tilt angle of the rotor spin axis Gz to thereby generate a gyroscopic reaction torque for opposing the pitching bias moment $\tau_{pitch}$. This centre of gravity shift can be maintained until the rotor spin axis Gz has been returned to a normal vertical orientation, thereby removing the accumulated lateral gyroscope bias.

Figure 12B:
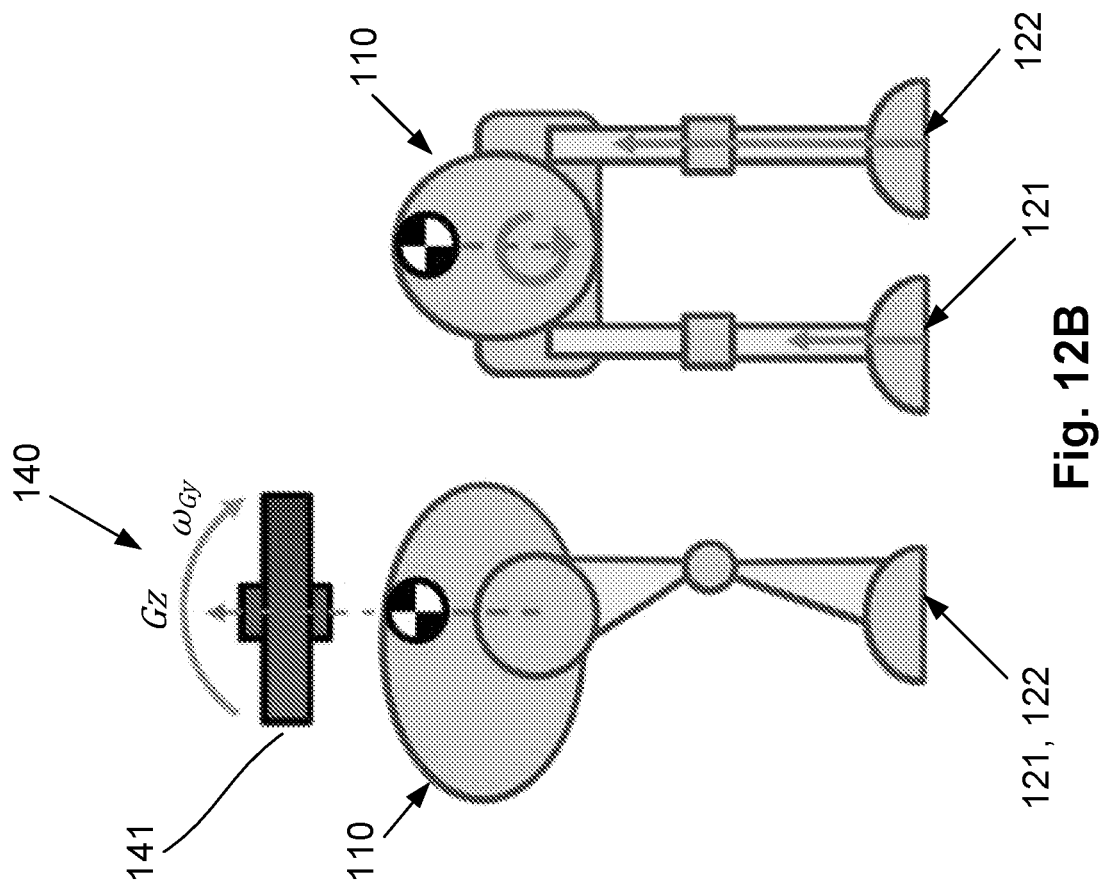
FIG. 12B are schematic diagrams of corresponding side and front views of the robot of FIG. 12A, in which the longitudinal gyroscope bias is corrected while using a dual support stance.
Figure 12A:
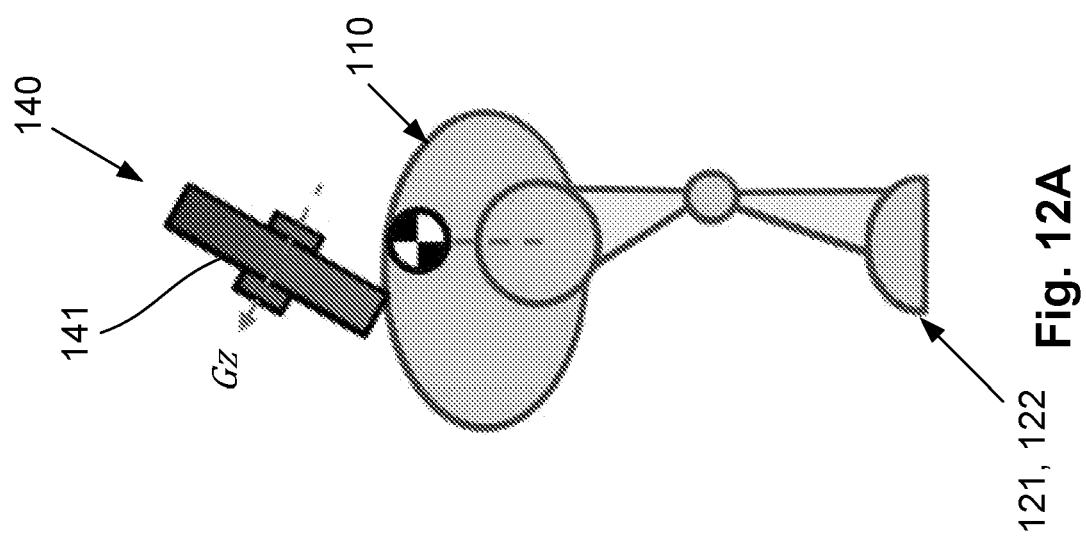
FIG. 12A is a schematic diagram of a side view of an example of a gyroscopically stabilised legged robot, in which longitudinal gyroscope bias has accumulated.

In another example, FIG. 12A shows a scenario in which longitudinal gyroscope bias has accumulated to a stage where the rotor spin axis Gz has tilted to almost 90° in the longitudinal direction. In this case, further longitudinal gyroscope bias will result in gimbal-lock and render the control moment gyroscope 140 incapable of counteracting further bias moments induced about the roll axis.

FIG. 12B illustrates a strategy for correcting the longitudinal gyroscope bias of FIG. 12A, by using a dual support stance to "unload" the control moment gyroscope 140 into the two ground reaction forces provided by the legs 121, 122 of the robot 100. When the legs 121, 122 are both in contact with the ground, the rotor spin axis Gz can be rotated with a rotational velocity $\omega_{Gy}$, in a direction that reduces the tilt angle of the rotor spin axis Gz, while the gyroscopic reaction torque generated by this rotation will be balanced by the two ground reaction forces as indicated in FIG. 12B. This dual support stance can be maintained until the rotor spin axis Gz has been returned to a normal vertical orientation, thereby removing the accumulated longitudinal gyroscope bias.

It will be appreciated that this principle of using ground reaction forces for correcting gyroscope bias, can be applied in different stances (i.e. other than a legs side-by-side standing stance) to allow for different gyroscope de-biasing corrections.

Figure 13A:
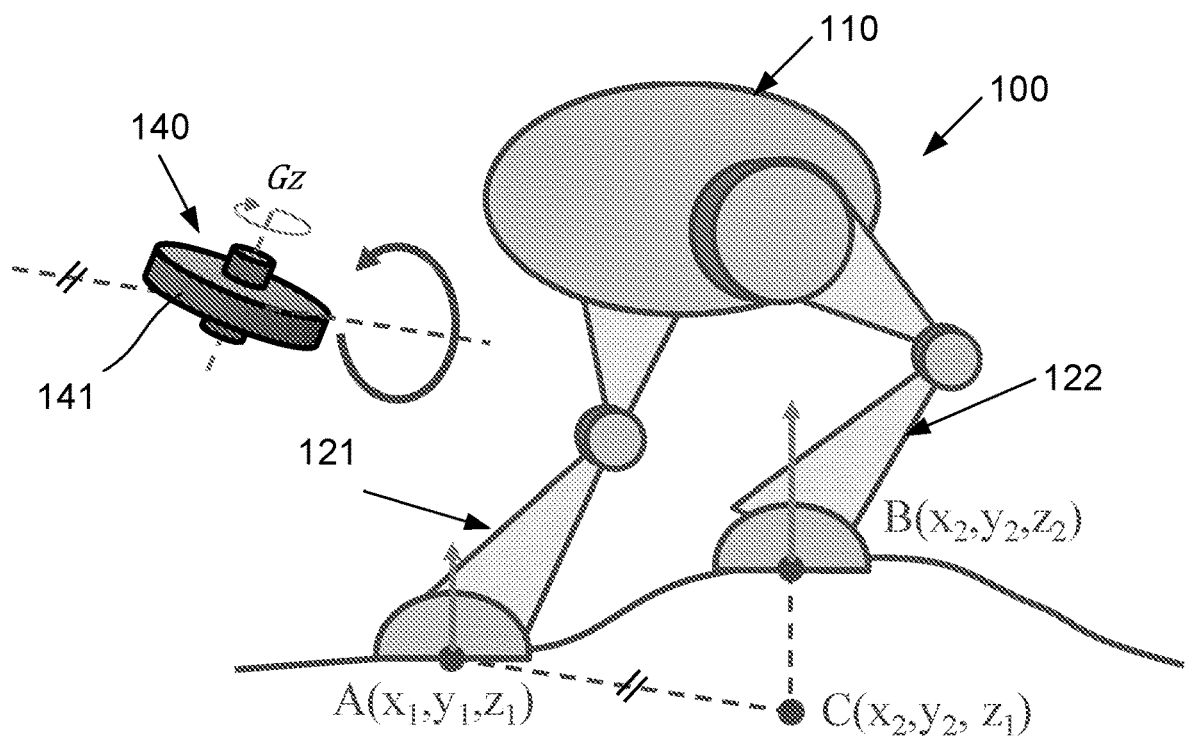
FIG. 13A is a schematic diagram of perspective view of an example of a gyroscopically stabilised legged robot, indicating a specific dual support stance defined by ground contact points and a corresponding gyroscope de-biasing axis.

For example, FIG. 13A shows an example in which the robot 100 is in a specific dual support stance on undulating ground. The robot 100 is supported by the legs 121, 122 at ground contact points A and B respectively, but point B is elevated relative to point A, and therefore point C is defined by vertically projecting point B onto a horizontal ground plane that intersects point A. The ground reaction forces through the feet during this dual support stance allows the rotor spin axis Gz to be rotated about an axis parallel to the line connecting points A and C (i.e. the ground contact points projected onto the horizontal ground plane), without inducing motion of the robot 100. Thus, gyroscope de-biasing can be carried out in a particular de-biasing axis in any dual support stance.

Figure 13B:
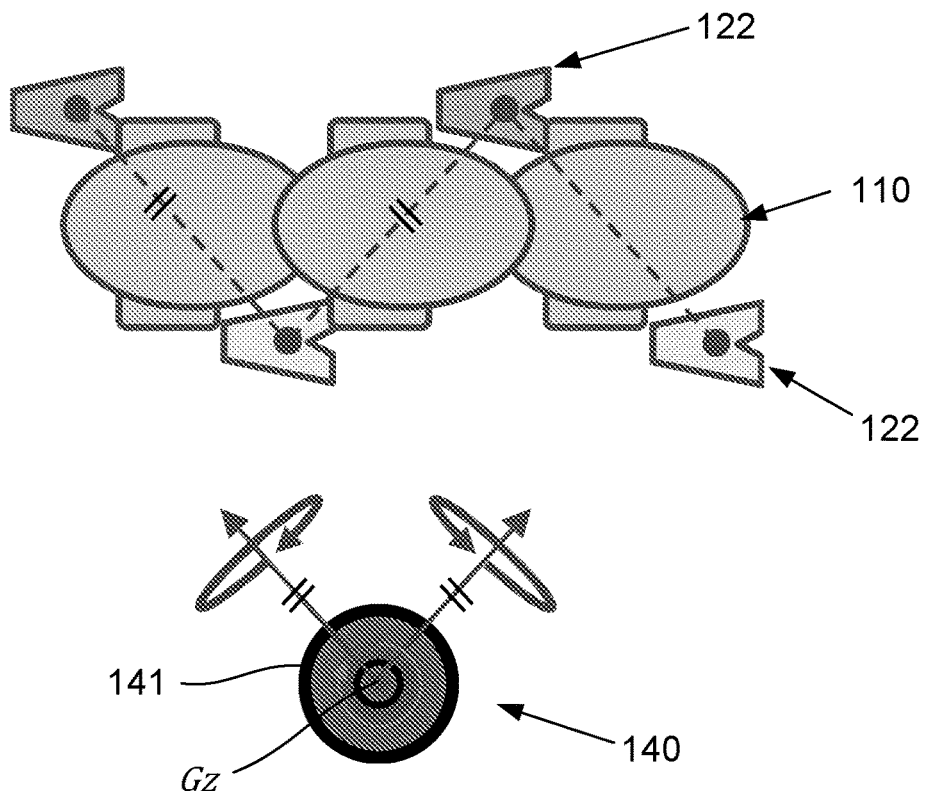
FIG. 13B is a schematic diagram of plan view of the robot of FIG. 13A, indicating different dual support stances and corresponding gyroscope de-biasing axes that occur while the robot walks.

Turning to FIG. 13B, which indicates the different dual support stances and corresponding gyroscope de-biasing axes that occur while the robot walks, it will be appreciated that alternating the leg stance while the robot walks allows the de-biasing axis to fully span the 2 degree of freedom space of the control moment gyroscope gimbals during the course of walking.

The different techniques discussed above for correcting gyroscope bias (i.e. by tilting the body or using dual support stances for reaction force de-biasing) can be combined together both in stationary standing and during active striding. It should be noted that reaction force de-bias is insufficient during stationary standing because it cannot compensate for rotor spin axis tilt orthogonal to the dual support stance. It should also be noted that the magnitude of torque that can be applied by reaction force de-bias is limited to the moment subtended by the robot weight over the ankle offset.

In some embodiments, the gyroscope controller 220 may include different control subsystems which are adapted to contribute different control output components in accordance with different inputs or control methodologies, as required to achieve desired stability control performance. Accordingly, the tilting mechanism 230 may be controlled using a combination of control output components from the different subsystems.

For example, the gyroscope controller 220 may include an orientation stability subsystem for causing gyroscopic reaction torques to be generated for stabilising the orientation of the body 110 based on the detected angular orientation of the body 110 about the pitch and roll axes. It will be appreciated that this may employ negative feedback control of the detected orientation such that the control output component of this subsystem may be based on a deviation between the detected orientation and a desired orientation, such as a horizontal orientation with zero pitch and zero roll.

Although this level of control alone may allow for sufficient stability control in some circumstances, additional control subsystems may be implemented to enhance the performance and/or provide additional useful functionalities.

For instance, the gyroscope controller 220 may optionally include a bias compensation subsystem for causing gyroscopic reaction torques to be generated for compensating an estimated bias moment based on the leg stance. This can allow estimated bias moments for a particular leg stance to be directly counteracted by gyroscopic reaction torques rather than having to react to an actual orientation change as a result of the bias moments. It will be appreciated that this can allow for more responsive stability control. This may involve a positive feedforward control methodology as will be further described in due course.

Additionally or alternatively, the gyroscope controller 220 may include a relaxation control subsystem which can provide further control functionalities depending on the leg stance. For instance, while the robot 100 is in a stable leg stance, the relaxation control subsystem may cause the rotor spin axis to be returned to a normal orientation, thereby "relaxing" any previously applied rotation of the rotor spin axis. On the other hand, while the robot is in an unstable leg stance, the relaxation control subsystem may cause gyroscopic reaction torques to be generated such that the body assumes an orientation that no longer induces bias moments. In either case, these functionalities can involve the use of positive feedback control which may cause rotational speeds of the gyroscope axes to increase proportional to a deviation of the rotor spin axis compared to the normal orientation. Further implementation details in this regard will also be described in due course.

The gyroscope controller 220 may be provided integrally with a processing device of the robot for providing the motion controller functionality and other optional functionalities such as navigation. Alternatively, the gyroscope controller 220 may be provided using a separate processing device which can operate completely independently from the motion controller.

Further features of preferred embodiments of the robot 100 will now be described.

In some embodiments, the tilting mechanism 230 is configured to rotate the rotor spin axis relative to a normally vertical orientation of the rotor spin axis. Accordingly, the rotor 141 may normally assume a horizontal orientation when it has not otherwise been tilted by the gimbals 142, 143.

In some examples, the spin axis and the respective gyroscope axes may be mutually orthogonal. For instance, in the dual-gimbal implementation of the CMG 140, the two gimbals 142, 143 may include a first gimbal 142 configured to rotate the rotor spin axis about a gimbal pitch axis and a second gimbal 143 configured to rotate the rotor spin axis about a gimbal roll axis. However, this is not essential and in alternative examples, non-orthogonal gyroscope axes may be provided, provided these are not collinear.

Typically, the two-axis gimbal set of the CMG 140 will include an inner gimbal that is pivotally coupled to the rotor 141, and an outer gimbal that is pivotally coupled to the inner gimbal and mounted on the robot 100. Thus, the outer gimbal can rotate the inner gimbal about an outer gimbal axis and the inner gimbal can rotate the rotor about an inner gimbal axis. It is noted that, in the embodiment of the robot 100 depicted in FIGS. 1A to 1D, the inner gimbal is the first gimbal 142 for rotating the rotor spin axis about the gimbal pitch axis as, and the outer gimbal is the second gimbal 143 for rotating the rotor spin axis about the gimbal roll axis. However, this particular arrangement is not essential and may be reversed.

In some embodiments, the rotor 141 may be configured to spin at a fixed rotor speed in use, such that the gyroscopic reaction torques may be solely determined by controlling speeds of rotation of the rotor spin axis about the respective gyroscope axes. However, a variable rotor speed may be used to allow more precise control of the gyroscopic reaction torques. It will also be appreciated that this can allow an additional degree of freedom for managing saturation of the CMG.

The legs 121, 122 may be of generally conventional construction, although the legs 121, 122 of the embodiment of the robot 100 shown in FIGS. 1A to 1D include some particularly advantageous features that will now be highlighted.

In this example, each leg 121, 122 includes hip and knee pivots having respective hip actuators 131, 132 and knee actuators 133, 134. The legged locomotion may thus be defined by rotational positions of the hip and knee actuators. In each leg, a thigh 123 extends between the hip and knee pivot and a calf 124 extends downwardly from the knee pivot.

Each leg 121, 122 may also include a foot 125 coupled to the leg by an ankle (as can be seen in the detail view of FIG. 1D) including a two-axis gimbal pivot 136, 137 for providing a pin contact with the surface. This simple pin contact arrangement can allow effective legged locomotion when stability is controlled using the CMG 140 as described above, without requiring complex ankle actuation as per other conventional stability techniques. Despite this, in preferred implementations of the robot 100 each ankle may still include a foot supination actuator 135 configured to apply a turning moment to the foot 125 in the surface plane. This can allow the robot 100 to turn by simply pivoting on a single foot. However, it is noted that a similar turning capability may alternatively be provided by providing a hip supination actuator.

Although the embodiment of the robot 100 shown in FIGS. 1A to 1D utilises a specific leg configuration including a particular arrangement of actuators (i.e. hip, knee and foot supination actuators), it should be appreciated that a range of different leg configurations may be implemented whilst otherwise allowing similar functionality.

Different leg configurations may be defined by the relative position of the supination actuator for twisting the foot relative to the body, with respect to the hip and knee actuators and the two-axis ankle pivot. It should be noted that the order of the ankle pivots is not important, for example the two-axis gimbal pivots mentioned above can be replaced by a constant velocity joint, or intersecting axes.

A number of different leg configurations will now be described with regard to the schematic representations shown in FIGS. 14A to 14D.

Figure 14B:
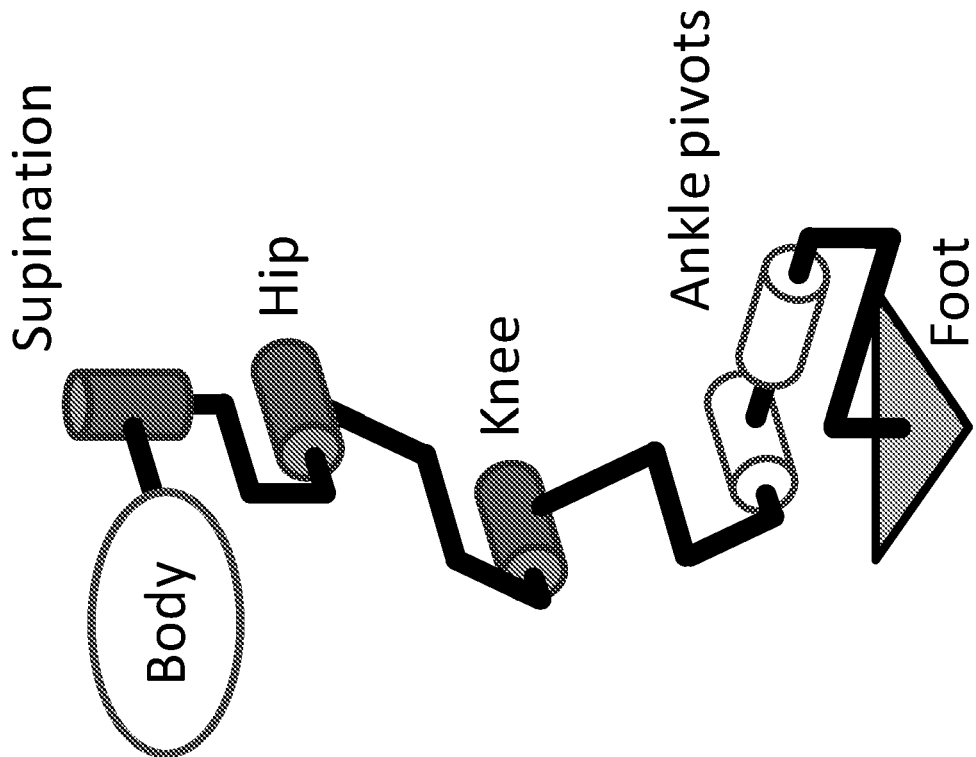
FIGS. 14A to 14D are schematic diagrams of different leg configurations defined by different supination actuator positions.
Figure 14A:
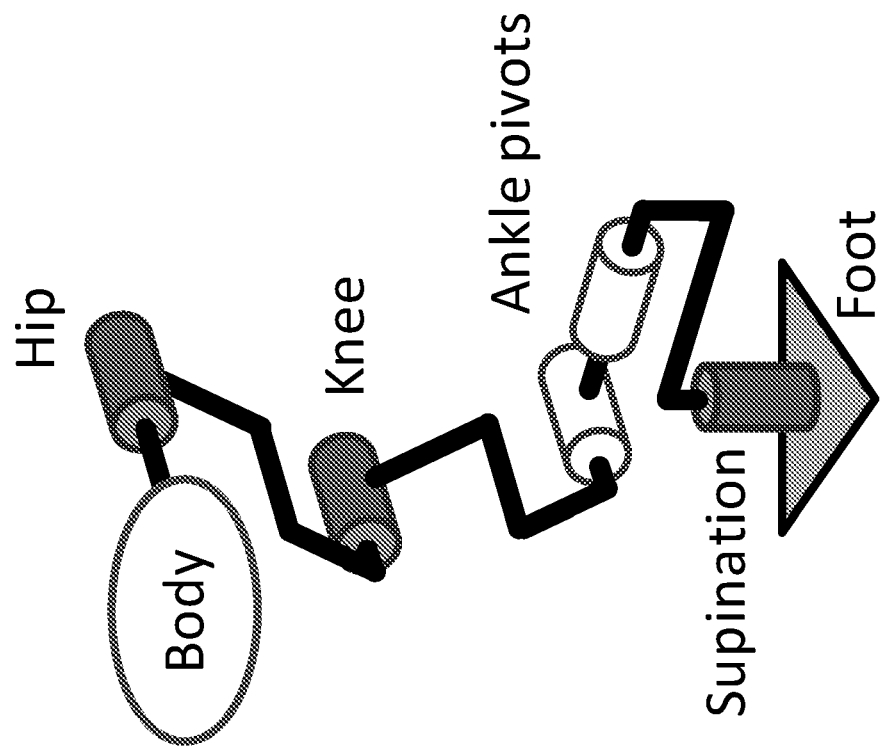

FIG. 14A represents the current leg configuration as described above, in which the supination actuator is provided in the form of a foot supination actuator positioned below the ankle pivots. It is noted that this version is easy to build but can be problematic on highly tilted ground, where the robot weight may apply high torques to the supination actuator.

FIG. 14B illustrates an alternative leg configuration in which the supination actuator is positioned above the hip actuator. Although this arrangement is ideal from a dynamical point of view, it may be complicated to construct to the hip mechanism.

Figure 14D:
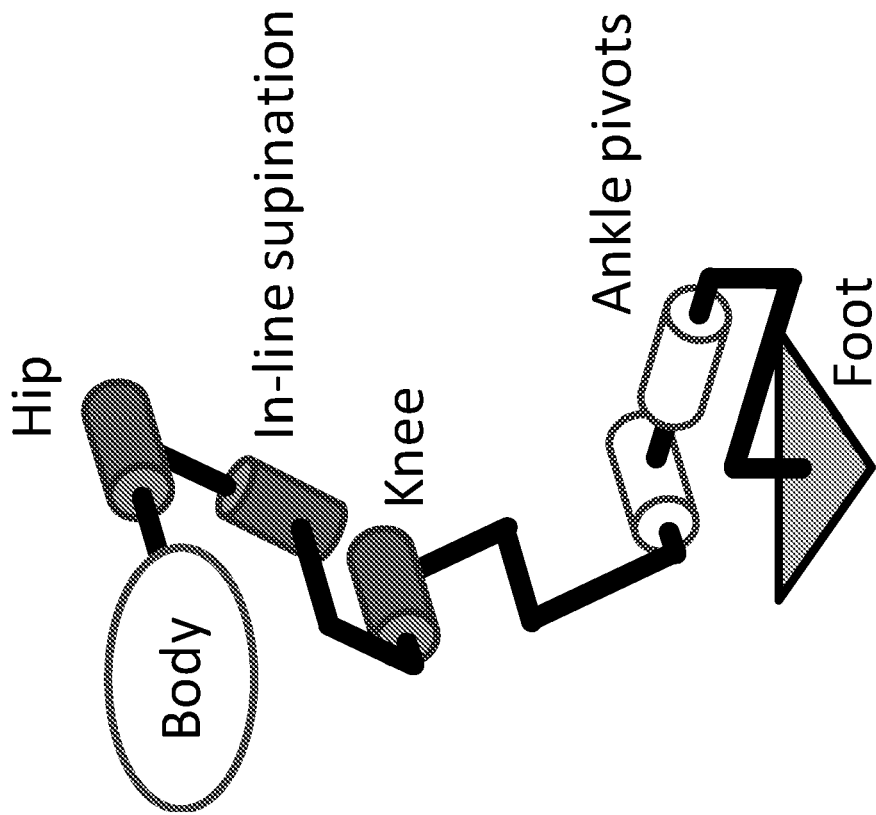
Figure 14C:
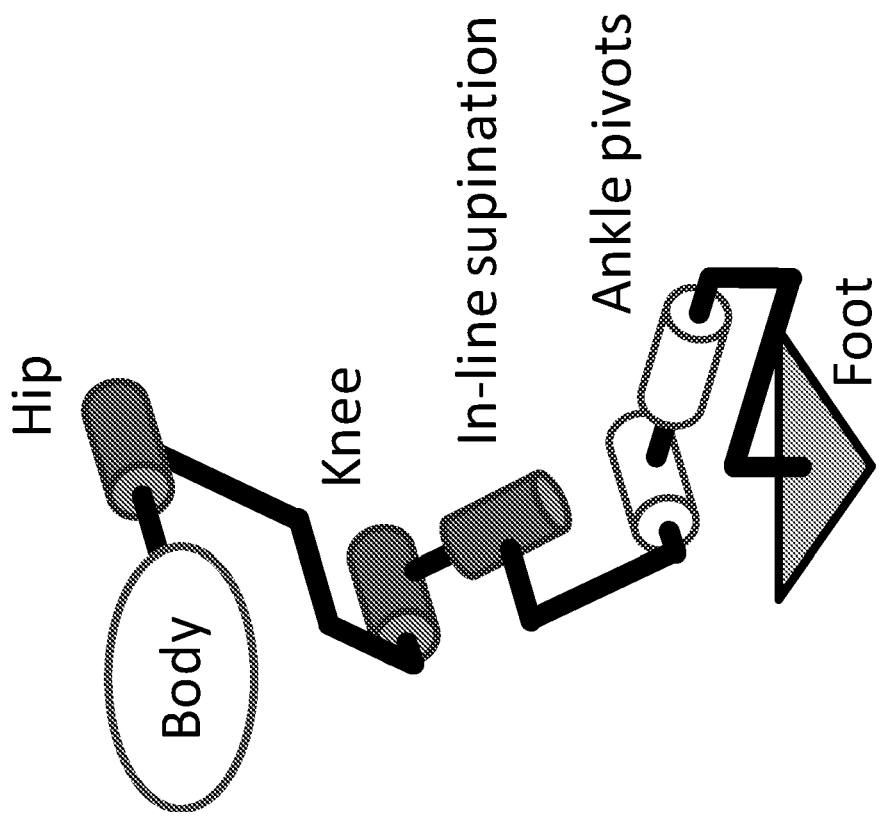

FIG. 14C shows another plausible alternative leg configuration in which the supination actuator is provided in-line with the calf, i.e. between the knee and the ankle pivots. This arrangement may provide a compromise between the two previous examples in terms of dynamical behaviour and construction complexity, but can lead to undesirable crosscoupling in the ankle.

Finally, FIG. 14D shows a leg configuration in which the supination actuator is provided in-line with the thigh, i.e. between the hip and the knee. However, this arrangement does not work in practice.

In preferred embodiments, each ankle may also include a braking system for selectively preventing rotation of the two-axis gimbal pivot 136, 137 of the ankle joint, which would otherwise be free to rotate. This can allow the ankle to be locked into a stable position if required, such as when the robot is powered down and not being actively stabilised.

The legs 121, 122 may be configured to allow the robot 100 to transition between a crouch position that is stable when the hip and knee actuators 131, 132, 133, 134 are deactivated, and a standing position. In some examples, the legs 121, 122 may be configured so that the hip and ankle pivots can remain aligned vertically during the transition between the crouch and standing positions.

Further construction details of an embodiment of the robot 100 will now be described. These construction details specifically relate to a small-scale experimental prototype of the robot 100 as shown in FIGS. 7A and 7B, although it is noted that this includes similar features as shown in FIGS. 1A to 1D and the following description will refer to reference numerals shown in those Figures.

Figure 7A:
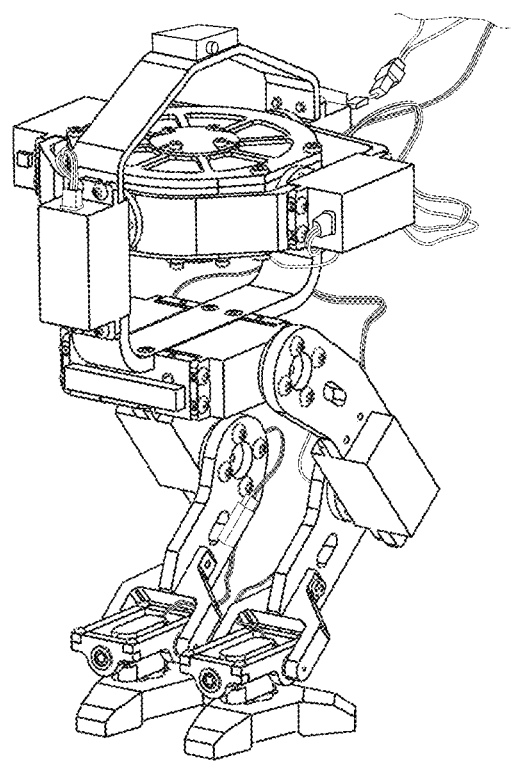
FIGS. 7A and 7B are photographs of an example of a gyroscopically stabilised legged robot in a testing configuration.
Figure 7B:
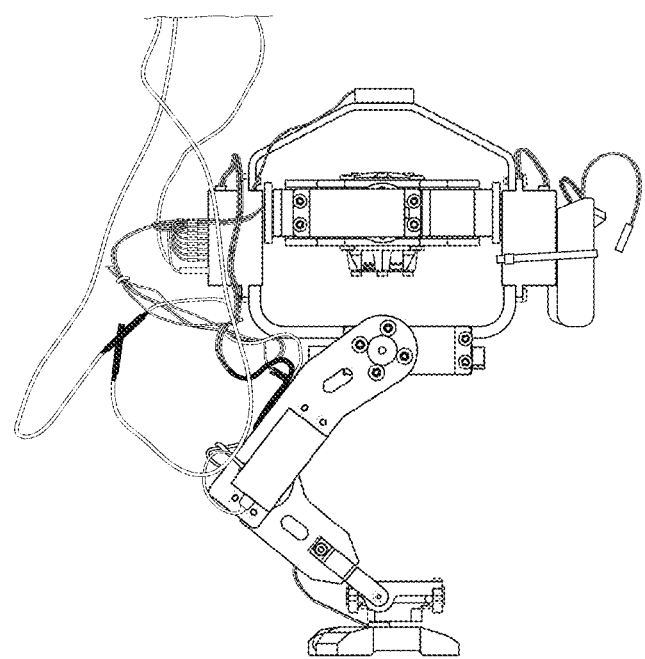

The robot 100 is principally constructed of milled 6061 aluminium, and consists of its gyroscope rotor 141, actuated gimbals 142, 143, thighs 123 and calves 124, ankle gimbals 136, 137 and feet 125, and electronics elements (not shown in FIGS. 1A to 1D—but visible in the photographs of FIGS. 7A and 7B).

The robot 100 is built around its CMG 140 and its rotor 141, further features of which are shown in FIG. 1C. The gyroscope rotor 141 is lathed from 316 stainless steel, to maximise achievable rotational velocity and ensure off-axis torsional strength. In the robot's testing configuration, the rotor 141 has a rotational inertia $I_G$ of $1.4210^{-4}$ kgm$^2$ and an operating speed of 13,000 RPM, but has been tested under maximum load to 23,000 RPM. At this speed the rotational kinetic energy of the body is 412 J, approximately that of a 9 mm pistol bullet. At operating speed, the energy is 131 J, equal to that of a 156 g cricket ball bowled at 147 kmph.

To protect the user, the gyroscope rotor 141 is surrounded by a shield 161 provided by a 1.65 mm thick band of low carbon steel (ASTM A513), inside an enclosure 160 formed of 6061 aluminium at least 3 mm thick. Together these provide anti-penetration and anti-spalling protection should a failure of the spinning rotor 141 produce high-speed fragments. The rotor 141 runs on SKF 618-7 dry-run bearings 162 rated to >50,000 RPM. The bearings 162 are retained in adjustable bearing blocks to allow the retention pressure and axial load force to be varied. The spinning of the gyroscope rotor 141 is powered by a Tiger Motor MT-1306 brushless DC motor 163.

As mentioned above, in this embodiment the CMG 140 includes a tilting mechanism 230 having a set of two gimbals 142, 143. The gimbal set consists of two concentric stages, each powered by respective gimbal actuators 152, 153 in the form of two MKS HBL575SL low-profile servos. Each HBL575SL provides 1.65 Nm of torque with a maximum speed of 14.96 rads$^{-1}$ at 7.4 V, per the manufacturer's datasheet. The servos are factory modified to allow full 180 degree rotation.

The low profile construction of the servos reduces the lateral and longitudinal profile of the gimbal set, which is a limiting design factor. The mechanical constraints of construction prevent the lateral gimbal stage from moving beyond 30 degrees. As the longitudinal direction has lower bias forces (about the pitch axis), controllable by step-size, a lower lateral gimbal range is not considered a problem.

The body is minimalist, and incorporates the lateral gimbal servos into its structure. Simple hip plates connect the body to the hip servos; both hip and knee servos are also HBL575SL. The 98 mm long thighs and 73 mm long calves are milled, with a lower fork structure connecting the calves to the ankles (see FIG. 1D). The legs are constructed such that at rest stance and in a crouched, unpowered stance the hips and ankles are aligned directly under the centre of gravity. Apertures through the calves and thighs allow wiring and equipment to be mounted to them.

The ankles are two-axis gimbal pivots with four 683-2Z roller bearings to carry the robot's weight without transmitting moments to the feet (see FIG. 2d); in this way, the ground contacts approximate a two degree of freedom pin contact. The feet are SLA (stereolithography) 3D printed using a Formlabs Form 2 clear resin. A servo in the ankle drives foot supination; by gaiting the supination during each stance cycle, the robot is able to affect a turn by applying a moment to the ground. The inter-ankle spacing is 22.5 mm, kept as short as possible to minimise the magnitude of the lateral CoG bias moment during single-leg stance.

All up, the experimental prototype of the robot weighs 1.3 kg and measures 240 mm from the base of its feet to the top of its body. Its total cost is approximately $4240 AUD.

For testing, the robot included a prototype circuit board based on the Atmel ATmegaX32D4-AU, using an Adafruit IMU module with a Bosch BNO-055 9-axis MEMS sensor in fusion mode for orientation sensing. The orientation control loop is driven by the sensor's 100 Hz fusion output. The board is mounted on the back of the rear gimbal servo, and the sensor module is rigidly fixed to the bottom of the gimbal frame. The board receives on-board power from a regulated benchtop laboratory power supply capable of providing 6.4 A at 8.4 V.

In further development, it is envisaged that the robot may use a PCB based around the ST STM32L082K microcontroller, installed between the hip servos directly under the gimbal centre. This version may be battery powered, with a pair of parallel 2-cell 1300 mAh lithium polymer packs mounted on the upper thigh, close to the hip, so as to lower the CoG and reduce inertial coupling.

Further details of a practical implementation of an orientation control system 200 for use in bipedal embodiments of the robot as described above will now be outlined.

The control philosophy for the robot is superficially similar to that of a helicopter robot, in that it is principally concerned with regulating body orientation through motion applied to its rotor. If correct attitude is maintained, then vertical height and locomotion may be independently applied.

Figure 4A:
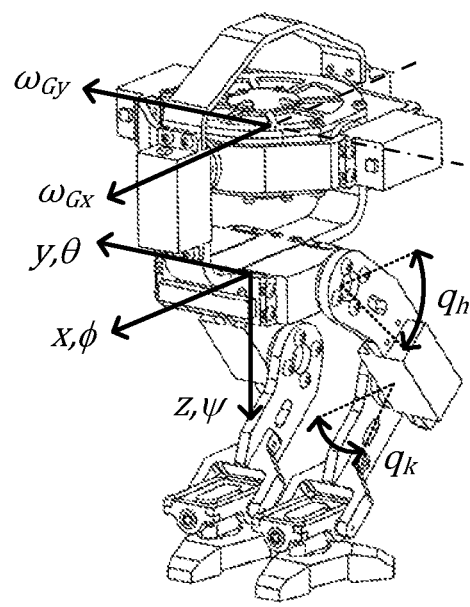
FIG. 4A is a perspective view of the robot of FIG. 1A indicating geometric references.
Figure 4B:
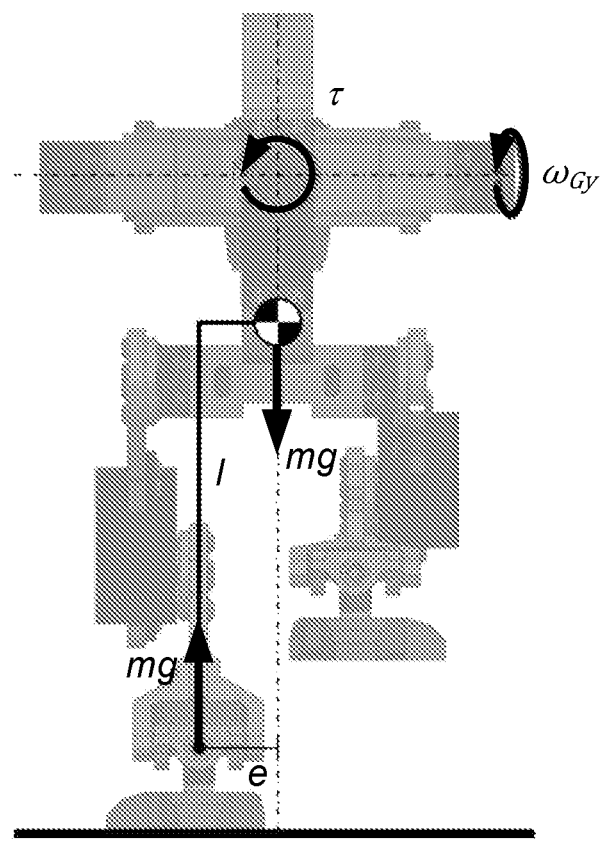
FIG. 4B is a front view free body diagram of the robot of FIG. 1A in a single leg stance.

To aid in understanding of the control technique, the dynamics of the robot will first be discussed with regard to the reference axes indicated in FIG. 4A and the free body diagram of the robot in FIG. 4B.

The dynamic model of the robot is based on a simple inverted pendulum compass gait configuration, assuming reaction force but no reaction torque at the ground (see FIG. 4B):

$$I_{xx}\ddot{\phi} = \tau_1 + vmg \quad (2)$$

$$I_{yy}\ddot{\theta} = \tau_1 + wmg \quad (3)$$

Where I is the rotational inertia of the torso, $\tau$ is the applied gyroscope reaction torque, $\phi$ and $\theta$ are the body roll and pitch angles, v and w are the longitudinal and lateral reaction moments applied by the stance leg to the body as functions of hip and knee angles $q_h$ and $q_k$, m is the mass and g is acceleration due to gravity.

Assuming legs of negligible mass, the simplified mechanics of the robot's legs allow the lateral moment (i.e. the bias moment about the roll axis of the body) to be reduced to:

$$w = w'(e \cos \phi - (l_1 \cos q_h + l_2 \cos q_k) \sin \phi) \quad (4)$$

Where e is the lateral offset of the ankle abduction pivot from the CoG, $l_1$ is the thigh length, $l_2$ is the calf length, and $w' \in -1, 0, 1$ indicates the right leg support, dual support, and left leg support stance phases, and $q_h$ and $q_k$ are the angle positions of the stance leg hip and knee, respectively.

The longitudinal moment (i.e. the bias moment about the pitch axis of the body) is given by the forward kinematics of the stance leg:

$$v = (l_2 \sin q_k - l_1 \sin q_h)\cos \theta - (l_1 \cos q_h + l_2 \cos q_k)\sin \theta \quad (5)$$

Switching between stance legs induces a discontinuity in the applied moment acting on the torso, as w changes sign, and as $q_h$ and $q_k$ switch to the values of the next stance leg. When the two feet are together in double support stance, directly under the CoG, the model reduces to that of an inverted pendulum. Given sufficiently small w and v, the entire control problem may be conceptualised as an inverted pendulum compass gait with bias disturbances.

Single support stance in an unstable leg support and applies a constant bias moment that must be countered by gyroscopic reaction torques generated by the CMG. If maintained long enough, the CMG will eventually saturate and the bias moment can no longer be countered. Thus, the robot cannot remain in single leg support stance indefinitely, and must switch between single leg supports to maintain w and v at an average value of zero. Thus, a bipedal robot subject to gyroscopic stability control as described above is necessarily a dynamic walking machine. At the end of each step, the gyroscope rotor will have tilted to one end of its range while compensating the bias moment, but it will be appreciated that this allows increased range to tilt back in compensation of the next, opposite bias moment. From a starting double support stance, the gyroscope may be pre-tiled in anticipation of taking its first step, as previously discussed.

During the dual leg support phase, the bipedal robot will have a single axis of stability along which it cannot fall. This provides an opportunity for the controller to 'unload' accumulated drift in the gyroscope rotor's spin axis orientation, so as to ensure that the average position of the gyroscope rotor is central to preserve its dynamics range.

Further implementation features of the orientation control system will now be discussed, specifically with regard to the example control architecture shown in FIG. 5.

As discussed above, the control task is not to achieve global stability, but rather to locally maintain orientation over the period of a single support phase. A normal step cycle is expected to take 1 to 2 seconds to complete, with an aborted step (e.g. if a cliff or obstacle is detected) taking up to 4 seconds. For zero movement, this would require 0.117 kgms$^{-1}$ of angular momentum, with the gyroscope rotor spin axis being rotated at 1.48 rads$^{-1}$ (85 degrees per second) over 340 degrees of motion. This is not achievable as moving beyond 180 degrees of rotation would put the gimbals into a singular orientation. A compromise is to allow the robot body to roll a small amount, thus absorbing some of the angular momentum. By allowing as much as 7 degrees of sway, the required gyroscope range may be halved to 170 degrees.

Figure 5:
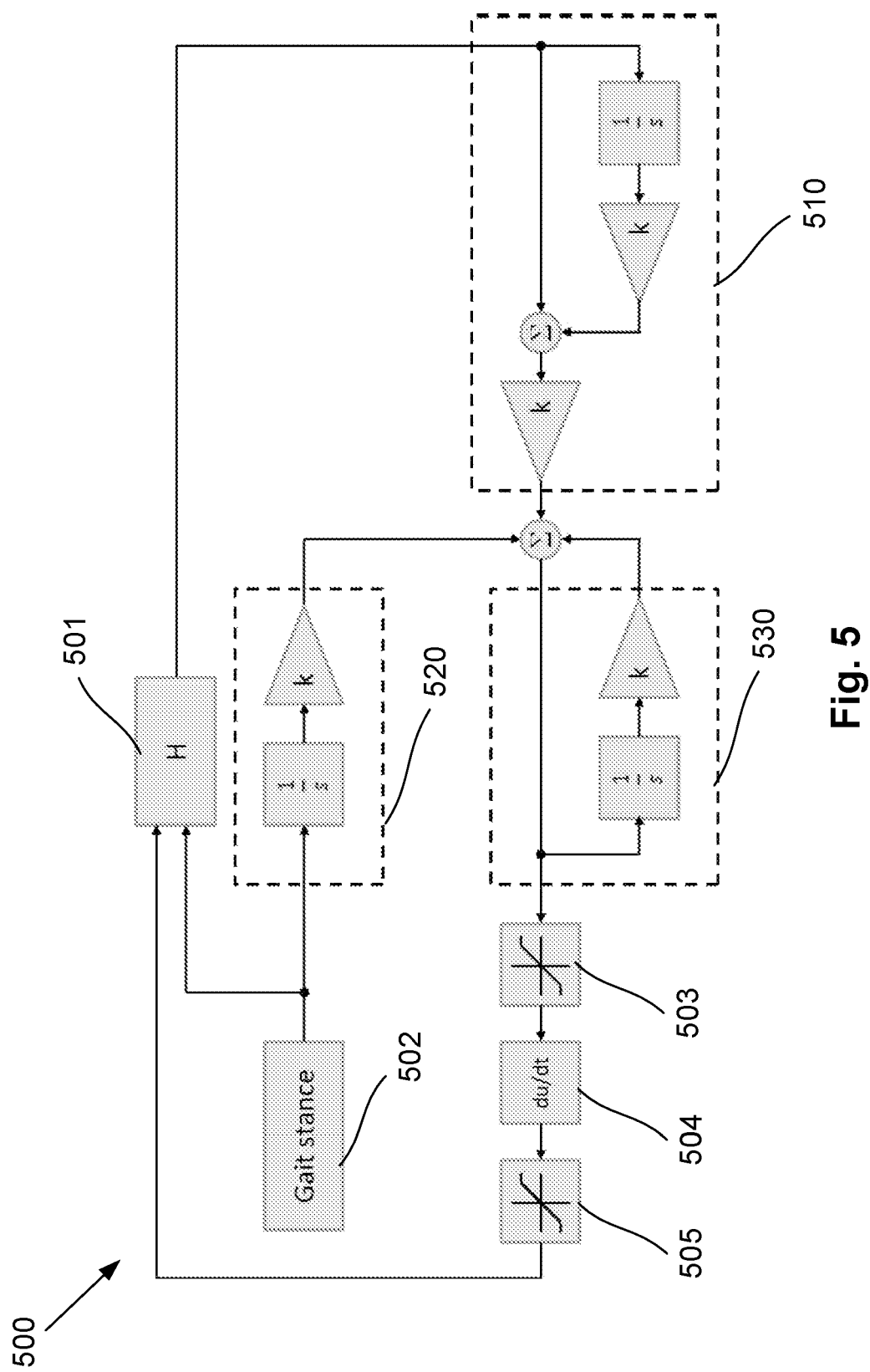
FIG. 5 is a schematic diagram of an example of a control architecture.

With regard to FIG. 5, the proposed control system design includes three subsystems: an orientation stability subsystem 510 providing local proportional-derivative (PD) orientation control, feed-forward bias compensation subsystem 520, and a 'relaxation' control subsystem 530. As the CMG's gyroscopic reaction torque output is proportional to an applied rotational velocity and the gimbal servos are driven by angle command, the control architecture is constructed with an offset dynamic order that incorporates an integrator 1/s. The control loop includes a model of the orientation dynamics 501 and optionally includes an input of gait/leg stance information 502.

To avoid integrating errors from a noisy velocity signal in the PD control derivative path of the orientation stability subsystem 510, the angle measurement is used directly for the D gain, and the P gain uses an integrated angle sum.

When in a single-leg stance, the feed-forward control of the bias compensation subsystem 520 provides a bias moment estimate from the forward kinematics based on the gait/leg stance 501. This serves to reduce the tracking error in the PD control, but is not required for stability at higher gyroscope rotor spin speeds.

The relaxation control subsystem 530 is a positive feedback term in the control loop. Its function is two-fold: firstly, it provides extra stability input by ramping up the control action of the CMG faster as the orientation angle of the rotor spin axis deviates from zero, and secondly it provides a means to return the orientation angle of the rotor spin axis to zero when in dual support stance. As an added effect, over longer steps, it also causes the bipedal robot to tilt on its ankle until the CoG is aligned above it, negating the bias moment—a behaviour akin to actuated static stability CoG shift. In this way, no knowledge of the locomotion is required for multiple strategic walking behaviours, aside from the optional feed-forward bias compensation term.

A sum of the control outputs from the three subsystems 510, 520, 530 undergoes conversion to the velocity space at 504 and is subjected to saturation limits at 503, 505.

Figure 6:
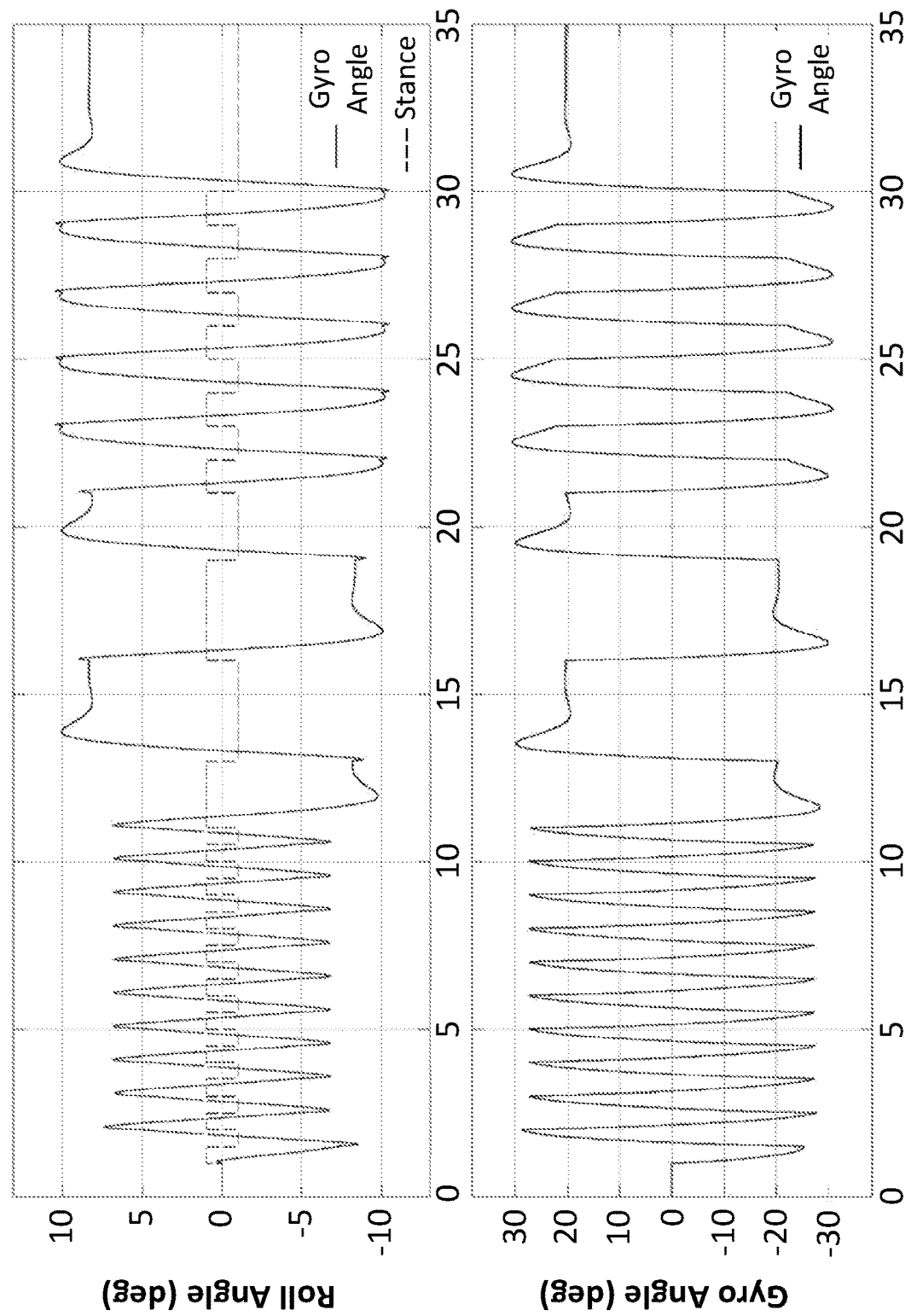
FIG. 6 is a plot of a simulation of the orientation control system performance across multiple steps of various length.

The orientation control system was simulated in Matlab Simulink, with a 100 Hz hybrid discrete-continuous model. Both lateral (i.e. roll control) and longitudinal (i.e. pitch control) models can be simulated by changing the structure of the applied bias load. As a first step, we use the lateral dynamics to show the correct operation of the design (see FIG. 6). The simulation shows that for realistic gain parameters, the robot's body roll orientation angle may be kept within ±7 degrees for short steps and ±10 degrees for steps as long as 4 seconds. The control parameters were: P=22:5, D=0:175, relaxation=7:5 and feed-forward was given by the leg stance indicator as discussed above.

The experimental embodiment of the robot shown in FIGS. 7A and 7B has been tested to validate the basic operation of its orientation control system, specifically to confirm that it can remain upright in pitch during the dual support leg stance with feet together. This stance is the starting point of motion for a biped, and important for performing tasks. As discussed above, the dynamic in this regard is equivalent to an inverted pendulum. In this stance, w and v are both zero, and thus the system should balance around the zero gyroscope roll angle.

For this test, the robot was suspended from a tripod stand as a safety rope, surrounded by safety screens. The robot was tethered by a power umbilical, UART lines, and a servo driver to allow for easy manual adjustment of foot orientation; these were themselves suspended to avoid putting load on the robot. Due to the added weight at the back of the robot from the control board, a battery module was placed at the front of the robot as a counterweight. The robot had a net forward-heavy CoG; it was manually tuned to move the target CoG −7.75 degrees. The control parameters were the same as per the above mentioned simulation, with the exception that feed-forward was set to zero.

Figure 8:
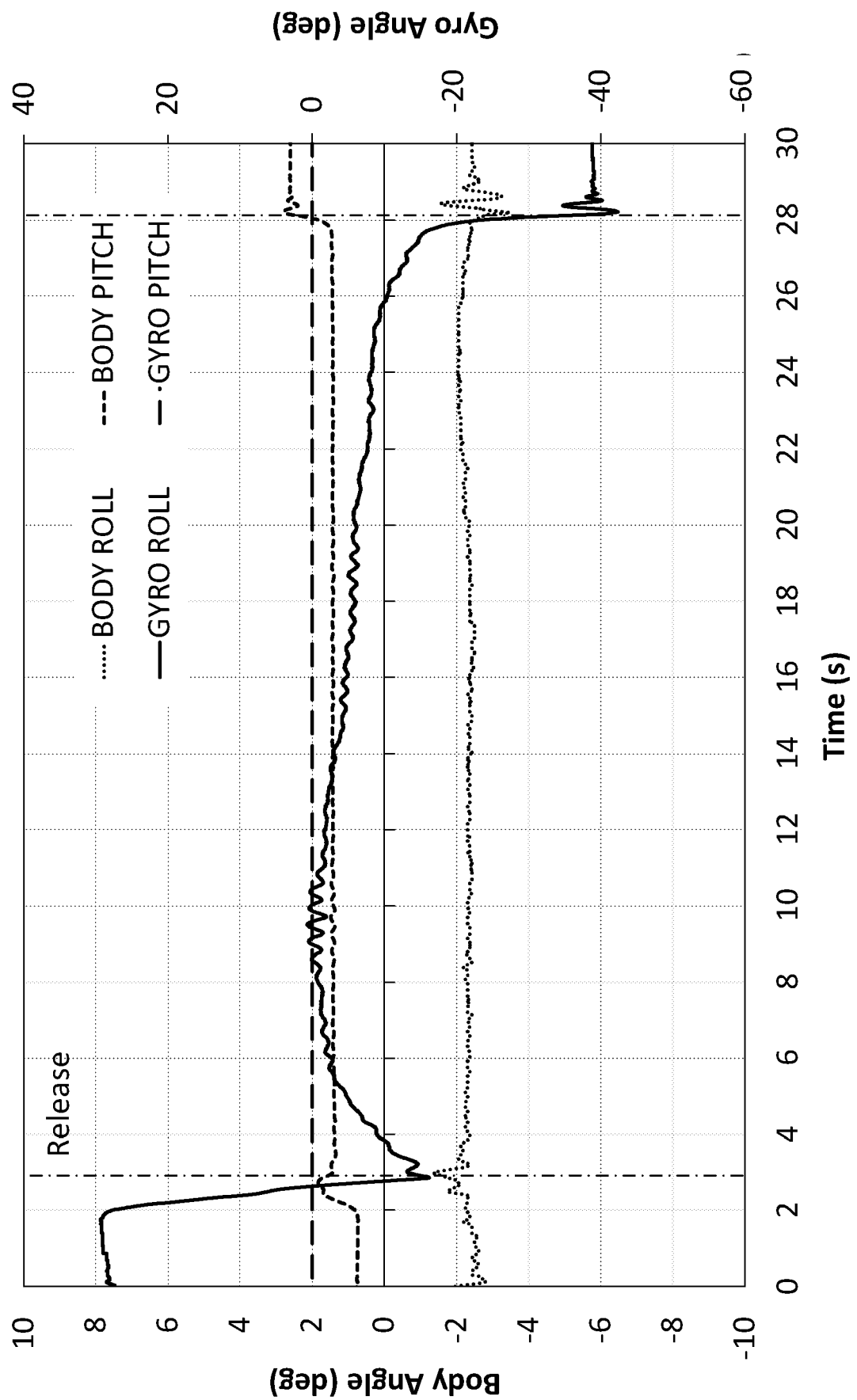
FIG. 8 is a plot of orientation and gyroscope rotation angles from testing of an example of the orientation control system.

During the test, the robot was commanded to move its limbs to their relative positions for standing feet together, thus putting slack on the suspension line. The robot was held vertical by the experimenter as the CMG was activated and the gyroscope rotor was brought up to speed. Once the rotor was at speed, the robot was released and the resulting motion recorded. It was found that the robot balanced well, with strong assertion of its commanded orientation as can be seen in the plot of FIG. 8. Over time there was slight drift in the gyroscope roll angle (noting that rotation of the rotor spin axis in a gyroscope roll axis approximately corresponds to a generated gyroscopic reaction torque in the body pitch axis), leading it to eventually saturate 25 seconds into the experiment. It is believed that the drift is a consequence of unaccounted for mechanical stress exerted by the umbilical cords.

This small, uncompensated bias drift raises the possibility that the CMG alone may not be adequate for rejecting some types of persistent pitch disturbance in the feet-together dual leg stance. For pitch dynamics, additional balance correction can be made by introducing a trim value applied to both the hip angles and the pitch reference angle. This has the same effect as a balance arm on other bipeds, but comes at zero additional cost. This approach cannot be used for the robot's roll stability, however, without adding complexity. Whether the same bias is seen in tetherless walking has yet to be tested. Increasing the gyroscope speed to 23,000 RPM will also provide greater momentum transfer prior to saturating, and further tuning of the relaxation controller may also help address this.

It will be appreciated that a CMG based orientation control system is a promising approach for stabilising very simple, low-cost legged robots. The control design required for orientation must consider the unique design challenges of per-cycle instability and saturation limits. The preferred control architecture combines feed-forward compensation for anticipated leg stance bias moments with a PD orientation controller and a 'relaxation' controller that compensates for offset bias and returns the gyroscope rotor to a normal centre position. Tests have validated simple feet-together dual support stance stabilisation of a 1.3 kg sub-scale experimental embodiment of the robot, equipped with a 13,000 RPM rotor.

In summary, a legged robot, such as a bipedal robot, may be gyroscopically stabilised by using a control moment gyroscope (CMG) to control the orientation of the robot as it walks and transitions from leg stance to leg stance, with the advantage of eliminating the slow or shuffling gait of static stability walking, or the need for complex control or high performance actuators in dynamic walking techniques, such as zero moment point, reaction force control and other approaches that rely on the force interaction between the foot/feet and ground for stability.

This technique works by using the CMG as a reservoir for angular momentum transfer. As the robot raises one leg to walk, the offset between the stance leg's foot and the Centre of Gravity (CoG) creates a bias moment that induces the robot to fall. The CMG is controlled to generate a counter-torque against the direction of fall, such that the reaction torque exerted by the CMG back on the robot's chassis maintains its orientation.

By controlling the CMG in two axes (pitch and roll), such as by using a two-axis gimbal arrangement, the longitudinal and lateral inclination (i.e. pitch and roll) of the robot may be maintained near level (or at some other desired angle).

The techniques described above can be favourably compared to conventional stability control techniques, such as static walking which maintains the support polygon of the feet to be under the CoG at all times, and dynamic walking which relies on accurately controlling the trajectory of the legs to redirect the CoG as the robot transitions through its walking/running phases. In these cases, the orientation of the robot is subject to the CoG and leg trajectory requirements for stability.

In contrast, in the above described techniques, the orientation of the robot, and thus its walking stability, may be locally independent of the leg motion. Thus, leg positioning and torque generation need not be exact and much cheaper, lower performance servo actuators may be used. Similarly, the quality of orientation sensing required for walking alone may be limited to that of the desired precision of torso orientation keeping. In this way, much more economical legged robots become possible, without necessarily sacrificing effective capability of the robot. With correct construction, such a robot may remain capable of traversing broken, sloping or uneven terrain, split levels/stairs, slippery surfaces and textured surfaces, using only rudimentary proximal obstacle and cliff detection.

It will be appreciated that the embodiments of the robot described above use a single control moment gyroscope including a tilting mechanism configured to rotate the rotor spin axis about two gyroscope rotation axes to generate respective gyroscope reaction torques. However, alternative embodiments of the robot have been envisaged which may utilise two or more control moment gyroscopes to provide similar functionality as described above.

For example, the robot may be configured generally as described in previous examples, but may include two control moment gyroscopes, each including a rotor that spins around a rotor spin axis in use, and a tilting mechanism for supporting the rotor relative to the robot. The tilting mechanism of each control moment gyroscope may be configured to rotate the rotor spin axis about a respective gyroscope rotation axis to thereby generate a respective gyroscopic reaction torque. The gyroscope controller may be configured to control operation of the tilting mechanisms of the two control moment gyroscopes based at least in part on the detected angular orientation of the body, such that gyroscopic reaction torques are generated to at least partially stabilise the angular orientation of the body during the legged locomotion of the robot, in a similar manner as described above.

In some implementations, a first control moment gyroscope may be configured to generate a first gyroscopic reaction torque to at least partially stabilise the angular orientation of the body about the pitch axis, and a second control moment gyroscope configured to generate a second gyroscopic reaction torque to at least partially stabilise the angular orientation of the body about the roll axis. This may be achieved by providing each control moment gyroscope with a single-axis gimbal configured to rotate about orthogonal axes for providing gyroscopic reaction torques in the pitch and roll axes, respectively.

In other words, two control moment gyroscopes having respective single-axis tilting mechanisms can be used to effectively replace a single control moment gyroscope having a two-axis tilting mechanism. In either case, the gyroscope controller can control operation of the tilting mechanism or mechanisms (e.g. gimbal actuators) to generate gyroscopic reaction torques for stabilising the angular orientation of the body of the robot during its locomotion.

It will be appreciated that such an arrangement using two control moment gyroscopes will involve trade-offs compared to the previously described embodiments using a single control moment gyroscope. Most significantly, using two control moment gyroscopes will essentially duplicate the control moment gyroscope hardware and thus have a substantial impact on the cost, size and weight of the robot.

Despite this, it can will allow for a less complex control strategy to be implemented, since each control moment gyroscope can be provide using a simpler single-axis gimbal, thereby avoiding cross coupling between the two gyroscope rotation axes as in the previously described embodiments using a single control moment gyroscope with a two-axis gimbal set.

Other examples may involve the use of multiple control moment gyroscopes each having two-axis tilting mechanisms. Although this may result in some redundancy, this may help to mitigate issues described above regarding accumulated gyroscope bias (e.g. gimbal-lock) since even if this occurs in one gyroscope the other gyroscope may remain un-biased. However, such an arrangement will once again involve the downsides of duplicating the control moment gyroscope hardware but without the same benefits in terms of less complex control strategy.

Whilst using multiple control moment gyroscopes may be less preferred for providing a low cost gyroscopically stabilised robot compared to using a single control moment gyroscope as discussed in previous examples, there may be other applications where this may be an acceptable arrangement. In any event, it will be appreciated that many of the same functionalities and preferred implementation features as described above for embodiments using single control moment gyroscopes may also be applied to embodiments involving multiple control moment gyroscopes.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A gyroscopically stabilised legged robot including:
   a) a body;
   b) a number of legs coupled to the body and configured for providing legged locomotion of the robot across a surface in use;
   c) an orientation sensor for detecting an angular orientation of the body;
   d) a control moment gyroscope mounted on the robot, the control moment gyroscope including:
      i) a rotor that spins around a rotor spin axis in use; and
      ii) a tilting mechanism for supporting the rotor relative to the robot, the tilting mechanism being configured to rotate the rotor spin axis about two gyroscope rotation axes to thereby generate respective gyroscopic reaction torques; and
   e) a gyroscope controller configured to control operation of the tilting mechanism based at least in part on the detected angular orientation of the body, such that gyroscopic reaction torques are generated to at least partially stabilise the angular orientation of the body during the legged locomotion of the robot, wherein the legged locomotion of the robot involves different leg stances including some unstable leg stances in which bias moments are induced about at least one of a pitch axis and a roll axis of the body, wherein the gyroscopic reaction torques are generated to at least partially counteract the bias moments, and wherein the gyroscope controller is further configured to:
      i) obtain an indication of a current leg stance; and
      ii) control operation of the tilting mechanism in accordance with the current leg stance.

2. A robot according to claim 1, wherein the orientation sensor is for detecting at least an angular orientation of the body about the pitch and roll axes of the body, and wherein the gyroscope controller is configured to control operation of the tilting mechanism such that gyroscopic reaction torques are generated to at least partially stabilise the angular orientation of the body about the pitch and roll axes during the legged locomotion of the robot.

3. A robot according to claim 1, wherein each leg has one or more respective leg actuators and the robot includes a motion controller configured to control operation of the leg actuators to cause the legged locomotion of the robot, and wherein the gyroscope controller is decoupled from the leg motion controller.

4. A robot according to claim 1, wherein the gyroscope controller is further configured to:
   a) determine estimated bias moments based on the current leg stance; and
   b) control operation of the tilting mechanism based at least in part on the estimated bias moments, such that the gyroscopic reaction torques are generated to at least partially counteract the estimated bias moments.

5. A robot according to claim 1, wherein the gyroscope controller is further configured to:
   a) determine that the robot is in a stable leg stance; and
   b) while the robot is in the stable leg stance, control operation of the tilting mechanism to cause the rotor spin axis to be rotated to a predetermined rotor spin axis orientation.

6. A robot according to claim 5, wherein the gyroscope controller is further configured to:
   a) obtain an indication of a next leg stance in the legged locomotion of the robot; and
   b) while the robot is in the stable leg stance, control operation of the tilting mechanism to cause the rotor spin axis to be rotated to a predetermined rotor spin axis orientation based on the next leg stance.

7. A robot according to claim 1, wherein the gyroscope controller includes at least one of:
   a) an orientation stability subsystem for causing gyroscopic reaction torques to be generated for stabilising the orientation of the body based on the detected angular orientation of the body about the pitch and roll axes;
   b) a bias compensation subsystem for causing gyroscopic reaction torques to be generated for compensating an estimated bias moment based on the leg stance; and
   c) a relaxation control subsystem for at least one of:
      i) while the robot is in a stable leg stance, causing the rotor spin axis to be returned to a normal orientation;
      ii) while the robot is in an unstable leg stance, causing gyroscopic reaction torques to be generated such that the body assumes an orientation that no longer induces bias moments; and iii) causing a rotational speed of the gyroscope axes to increase proportional to a deviation of the rotor spin axis compared to the normal orientation.

8. A robot according to claim 1, wherein at least one of:
   a) the tilting mechanism is configured to rotate the rotor spin axis relative to a normally vertical orientation of the rotor spin axis; and
   b) the rotor spin axis and the respective gyroscope rotation axes are mutually orthogonal.

9. A robot according to claim 1, wherein the tilting mechanism includes a set of two gimbals including respective gimbal actuators and being configured to rotate the rotor spin axis about the gyroscope rotation axes, and wherein the gyroscope controller is configured to control operation of the gimbal actuators.

10. A robot according to claim 9, wherein the two gimbals include:
    a) a first gimbal configured to rotate the rotor spin axis about a gyroscope pitch axis; and,
    b) a second gimbal configured to rotate the rotor spin axis about a gyroscope roll axis.

11. A robot according to claim 9, wherein the two gimbals include:
    a) an inner gimbal that is pivotally coupled to the rotor; and
    b) an outer gimbal that is pivotally coupled to the inner gimbal and mounted on the robot.

12. A robot according to claim 1, wherein the rotor spins at a fixed rotor speed in use, and wherein the gyroscopic reaction torques are determined by controlling speeds of rotation of the rotor spin axis about the respective gyroscope axes.

13. A robot according to claim 1, wherein each leg includes:
    a) hip and knee pivots having respective hip and knee actuators, the legged locomotion being defined by rotational positions of the hip and knee actuators; and
    b) a foot coupled to the leg by an ankle joint including a two-axis gimbal pivot for providing a pin contact with the surface.

14. A robot according to claim 13, wherein each ankle includes at least one of:
    a) a foot supination actuator configured to apply a turning moment to the foot in the surface plane; and
    b) a braking system for selectively preventing rotation of the ankle joint.

15. A robot according to claim 13, wherein the legs are configured to allow the robot to transition between a crouch position that is stable when the hip and knee actuators are deactivated, and a standing position.

16. A robot according to claim 1, wherein the robot is a bipedal robot including two legs.

17. An orientation control system for use in a legged robot including a body, and a number of legs coupled to the body and configured for providing legged locomotion of the robot across a surface in use, the orientation control system including:
    a) an orientation sensor for detecting an angular orientation of the body;
    b) a control moment gyroscope mounted on the robot, the control moment gyroscope including:
       i) a rotor that spins around a rotor spin axis in use; and
       ii) a tilting mechanism for supporting the rotor relative to the body, the tilting mechanism being configured to rotate the rotor spin axis about two gyroscope rotation axes to thereby generate respective gyroscopic reaction torques; and
    c) a gyroscope controller configured to control operation of the tilting mechanism based at least in part on the detected angular orientation of the body, such that gyroscopic reaction torques are generated to at least partially stabilise the angular orientation of the body during the legged locomotion of the robot, wherein the legged locomotion of the robot involves different leg stances including some unstable leg stances in which bias moments are induced about at least one of the pitch and roll axes of the body, wherein the gyroscopic reaction torques are generated to at least partially counteract the bias moments, and wherein the gyroscope controller is further configured to:
       i) obtain an indication of a current leg stance; and
       iii) control operation of the tilting mechanism in accordance with the current leg stance.

18. A method for use in controlling the orientation of a legged robot including a body, and a number of legs coupled to the body and configured for providing legged locomotion of the robot across a surface in use, the method including:
    a) using an orientation sensor, detecting an angular orientation of the body;
    b) using a control moment gyroscope mounted on the robot to generate gyroscopic reaction torques to at least partially stabilise the angular orientation of the body during the legged locomotion of the robot, wherein:
       i) the control moment gyroscope includes:
          (1) a rotor that spins around a rotor spin axis in use; and
          (2) a tilting mechanism for supporting the rotor relative to the robot, the tilting mechanism being configured to rotate the rotor spin axis about two gyroscope rotation axes to thereby generate respective gyroscopic reaction torques; and
    c) the gyroscopic reaction torques are generated using a gyroscope controller configured to control operation of the tilting mechanism based at least in part on the detected angular orientation of the body, wherein the legged locomotion of the robot involves different leg stances including some unstable leg stances in which bias moments are induced about at least one of the pitch and roll axes of the body, wherein the gyroscopic reaction torques are generated to at least partially counteract the bias moments, and wherein the gyroscope controller is further configured to:
       i) obtain an indication of a current leg stance; and
       ii) control operation of the tilting mechanism in accordance with the current leg stance.

* * * * *